US008763303B2

(12) United States Patent
Johnson et al.

(10) Patent No.: US 8,763,303 B2
(45) Date of Patent: Jul. 1, 2014

(54) TREE GUARD

(75) Inventors: Kimberly Johnson, New York, NY (US); Bruce Bagley, Toronto (CA)

(73) Assignee: Curb Allure LLC, New York, NY (US)

( * ) Notice: Subject to any disclaimer, the term of this patent is extended or adjusted under 35 U.S.C. 154(b) by 232 days.

(21) Appl. No.: 13/079,803

(22) Filed: Apr. 4, 2011

(65) Prior Publication Data

US 2012/0247011 A1   Oct. 4, 2012

(51) Int. Cl.
 *A01G 13/02*   (2006.01)
(52) U.S. Cl.
 USPC ............................................. 47/32.4; 47/66.1
(58) Field of Classification Search
 USPC ............. 47/32.4, 32.5, 33, 66.1, 32, 39, 66.6, 47/73; 52/102; 256/65.08
 See application file for complete search history.

(56) References Cited

U.S. PATENT DOCUMENTS

| | | | |
|---|---|---|---|
| 110,091 A | 12/1870 | Trumbull | |
| 1,031,941 A | 7/1912 | Lanham | |
| 1,160,728 A | 11/1915 | Liggett | |
| 3,037,593 A * | 6/1962 | Webster | 52/476 |
| 3,506,243 A | 4/1970 | Seiler | |
| 3,918,686 A * | 11/1975 | Knott et al. | 256/59 |
| D268,084 S | 3/1983 | Haggard | |
| D270,609 S | 9/1983 | Haggard | |
| 4,623,128 A * | 11/1986 | Dutch et al. | 256/65.08 |
| 4,684,108 A | 8/1987 | Bergagnini | |
| 5,016,388 A | 5/1991 | Burress et al. | |
| 5,231,793 A | 8/1993 | Allen | |
| 5,255,897 A * | 10/1993 | Pepper | 256/24 |
| 5,394,645 A | 3/1995 | Wilson | |
| 5,882,001 A | 3/1999 | Reinbold | |
| 5,938,184 A * | 8/1999 | DeSouza | 256/19 |
| 6,018,910 A | 2/2000 | Marks | |
| D422,885 S | 4/2000 | Marino | |

(Continued)

FOREIGN PATENT DOCUMENTS

| | | |
|---|---|---|
| CA | 2092865 A1 | 9/1994 |
| GB | 2435055 | 4/2008 |

(Continued)

OTHER PUBLICATIONS

International Search Report and Written Opinion issued in International Application No. PCT/US2012/031973 dated Oct. 31, 2012; 11 pages.

(Continued)

*Primary Examiner* — Rob Swiatek
*Assistant Examiner* — Lisa Tsang
(74) *Attorney, Agent, or Firm* — Mauriel Kapouytian Woods LLP; Michael Mauriel

(57) ABSTRACT

Various embodiments related to a tree guard. One embodiment provides a modular tree guard assembly. Various other embodiments disclosed include one or more of the following: a multi-purpose top rail unit facilitating flexible installation of various side panel units and top rail accessories; modular side panel units including decorative units and urine guard units; corner and other post units; and various adjustable foot units. In one embodiment, a sign holder unit of the tree guard assembly is provided with different tamper proof bolts than are other elements of the assembly such that control over signage on the tree guard may be effectively given to a different entity than an entity with control over assembly of the rest of the tree guard unit. Various other embodiments related to tree guards are disclosed.

27 Claims, 46 Drawing Sheets

(56) References Cited

U.S. PATENT DOCUMENTS

| | | | |
|---|---|---|---|
| D423,626 S | 4/2000 | Marino | |
| D428,798 S | 8/2000 | Marino | |
| 6,108,970 A | 8/2000 | Ball | |
| 6,138,993 A | 10/2000 | Mitchell | |
| 6,202,367 B1 | 3/2001 | Marino | |
| 6,254,064 B1 | 7/2001 | Gibbs | |
| 6,283,456 B1 * | 9/2001 | Benz et al. | 256/24 |
| 6,311,428 B1 | 11/2001 | Marino | |
| 6,588,144 B1 | 7/2003 | Staggs | |
| 6,648,304 B1 | 11/2003 | Zhu | |
| 6,719,276 B1 | 4/2004 | Bush | |
| 6,779,781 B2 * | 8/2004 | Bebendorf | 256/19 |
| 6,866,251 B2 | 3/2005 | Rosaen | |
| 6,913,249 B1 * | 7/2005 | Lerdu | 256/24 |
| D518,419 S | 4/2006 | Smith | |
| 7,025,335 B2 | 4/2006 | Zhu | |
| 7,216,854 B2 | 5/2007 | Bryan | |
| 7,240,637 B2 | 7/2007 | Rosen | |
| 7,347,412 B1 | 3/2008 | Zhu | |
| 7,500,654 B2 | 3/2009 | Rosaen | |
| 2004/0211115 A1 | 10/2004 | Smith | |
| 2006/0118771 A1 | 6/2006 | Stein | |
| 2008/0256856 A1 | 10/2008 | Rosaen | |
| 2009/0084033 A1 | 4/2009 | Duncan et al. | |
| 2009/0140227 A1 | 6/2009 | Cantatore | |
| 2009/0199466 A1 | 8/2009 | Rosaen | |
| 2010/0025648 A1 | 2/2010 | Walpole | |

FOREIGN PATENT DOCUMENTS

| | | |
|---|---|---|
| JP | 04-311323 A | 11/1992 |
| WO | WO 2007/138475 A2 | 12/2007 |
| WO | WO 2007138475 A3 | 12/2007 |
| WO | WO 2010/022905 A1 | 3/2010 |

OTHER PUBLICATIONS

Interlaken Planting Fence System, Iron Age Designs, Jun. 6, 2010, www.ironagegrates.com.

* cited by examiner

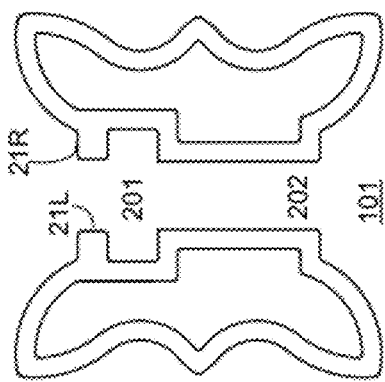
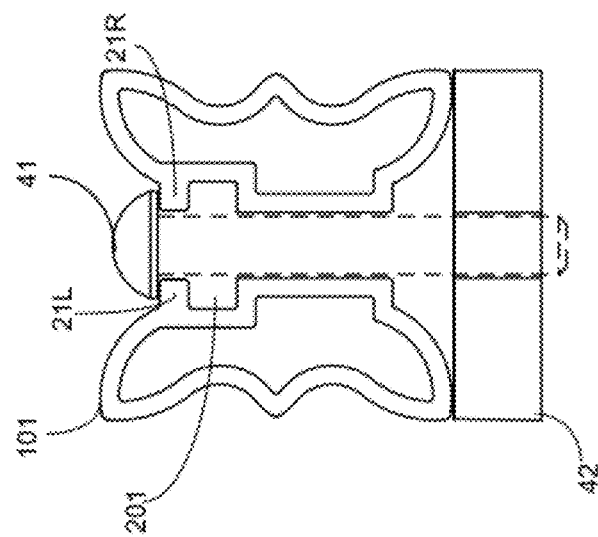
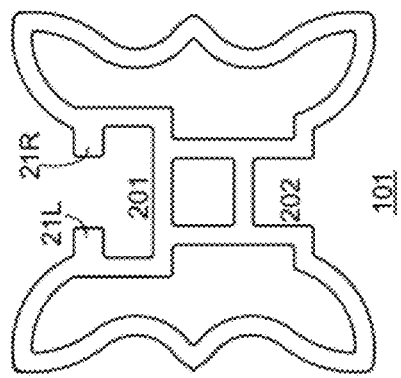
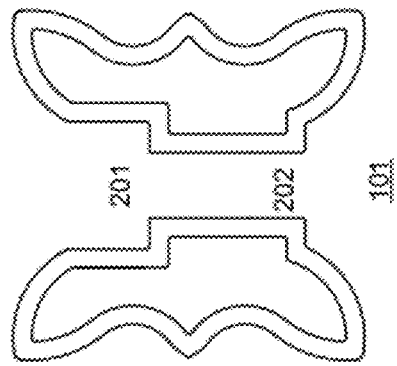

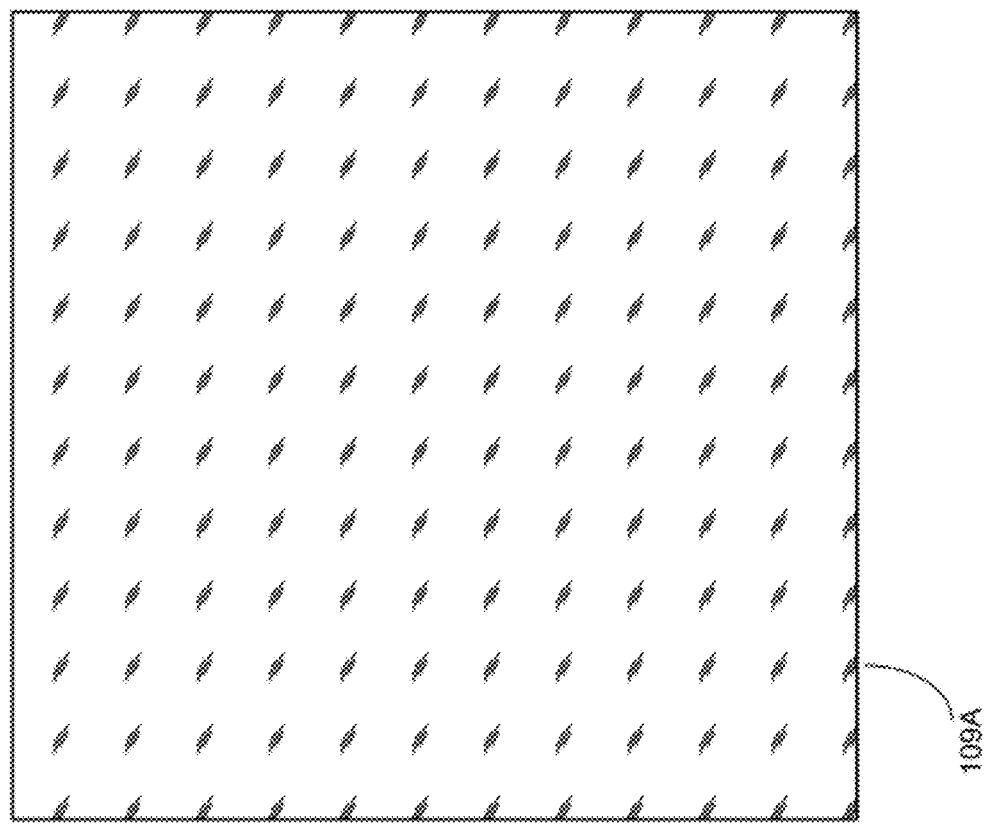
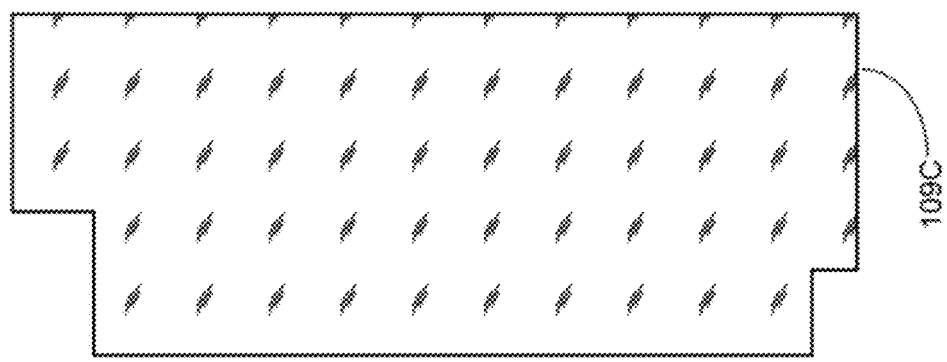
FIG. 8

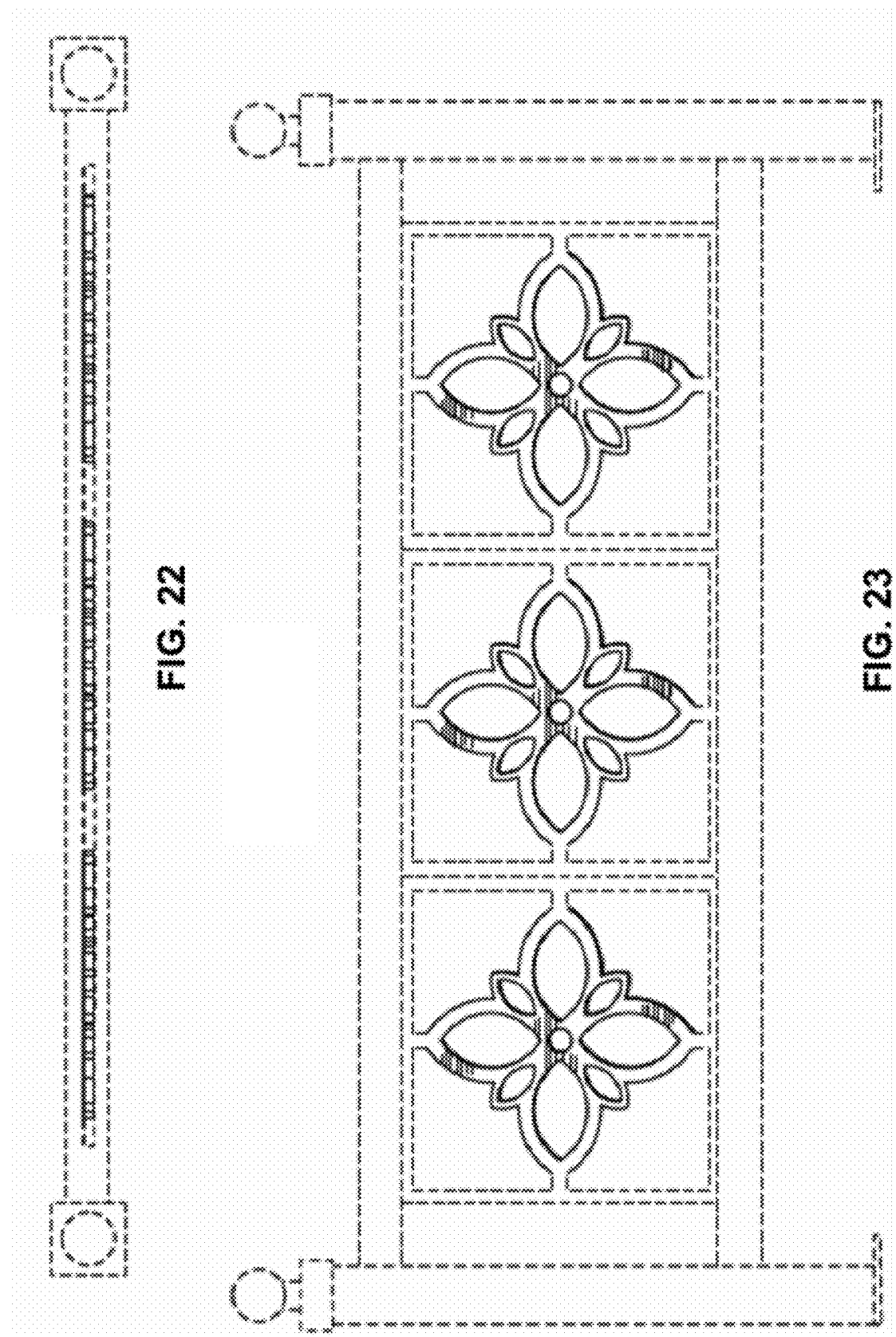

TREE GUARD

BACKGROUND

This invention relates generally to the area of tree guards. Tree guards are typically short fences or other structures that surround the base of street trees that are planted in tree pits in the sidewalk or on grassy boulevards. Tree guards are especially important in urban areas. The urban environment presents many challenges to trees. Abrasion from car doors or bicycle chain locks can damage the bark and leave the tree more vulnerable to disease. Furthermore, foot traffic, trash, dog urine and other sources can also damage trees.

As a result of various urban hazards, urban trees have a shorter life expectancy than other trees. At the same time, trees and gardens are important to the environment. They increase aesthetics and property values, reduce aggression and noise, and provide other environmental benefits (e.g., enhanced air quality and temperature moderation). Because of the desirability of having trees and gardens and the known hazards to trees in the urban environment, it is known to put fences, brick walls, and other structures around trees, particularly in urban environments, to protect them from these hazards.

SUMMARY

However, many of these known structures actually harm trees in particular as their design can often girdle the tree, compact the soil or restricts water from flowing into the tree pits. Moreover, existing urban tree guards are typically custom made iron fences that are welded around a tree, which requires specialized skills and equipment. This makes it inconvenient and expensive to provide tree guards and, as a result, many trees in urban environments lack proper protection. A modular tree guard assembly is needed that can be easily assembled and installed and is cost effective. Moreover, there is a need to make it easy to enhance tree and garden guard units with various modular sub-components after initial assembly to make them more attractive and/or functional. A further need exists to be able to easily install tree guard units despite variation in ground conditions and obstructions. There is also a need to promote sponsorship of tree guards and provide secure and easy control over associated name displays on tree guards.

An embodiment of the present invention includes a modular tree guard assembly. One embodiment provides a multi-purpose top rail unit with a top side groove for selectively installing top rail accessories at selected locations along the top rail unit and a bottom side groove for supporting modular side panel units including, in one embodiment, decorative units and urine guard units. In one embodiment, a slot is provided through the top rail so that side panel units may be introduced through a top rail to be held by a bottom side groove of the top rail and a top side groove of a bottom rail. In one embodiment, the slot and top side groove are dimensioned relative to an extended nut such that the nut may be introduced through a widened opening between lips above the slot, but still supported in the top side groove such that the extended nut may be secured to the top rail using a bolt fastened through the slot and into the extended nut. In one embodiment, this allows securely obstructing the slot with the extended nut so that installed side panel units cannot be easily removed. In one embodiment, this allows a top rail accessory to more easily be secured to the top rail at a selected location using a bolt fastened to an extended nut through the top rail accessory after positioning the extended nut as a desired location along the top rail.

In one embodiment, a corner urine guard unit is provided that may be introduced through a top rail slot and positioned at a selected location along grooves in top and bottom rails of a tree guard. In one embodiment, the grooves are dimensioned such that a corner urine guard unit and/or other side panel urine guards may be placed in overlapping fashion with other side panel units such as decorative side panel units.

In one embodiment, rails and corner posts are provided along with optional middle posts and/or end posts to allow different tree guard configurations. In some embodiments, a variety of optional rails of various lengths are provided so that, depending on configurations of corner posts and middle posts and selected length rails, a variety of side lengths may be realized in a modular guard system.

In one embodiment, a different unique tamper proof bolt is provided for securing a top rail sign holder than is provided for securing other elements of the tree guard assembly. In this embodiment, a bit used for securing/unsecuring other elements of the tree guard assembly is not effective to remove bolts securing the top rail sign holder and/or a sign in the top rail sign holder. In another embodiment, a unique tamper proof bolt is provided for use with a first extended nut to block a top rail slot for securing side panel signage units, the bolt being different than bolts provided for use with other elements of the tree guard assembly.

In one embodiment, adjustable feet are provided such that a post unit may be secured to an adjustable foot unit at selected locations such that an effective length (height) of a first post and foot unit combination can be made adjustably different than an effective length of a second post and foot unit to compensate for unevenness in a ground portion of a tree pit and/or gradient variations in ground locations inside or outside of the tree pit. In one embodiment, an alternative foot unit is provided that may be used to secure the tree guard to a concrete or similar surface just outside of a tree pit opening. In one embodiment, an anchor plate is movably coupled to a post unit such that a stake opening may more easily be selectively located within a tree pit to find suitable ground for driving a stake into the ground through the opening to secure the anchor plate and post to the ground of the tree pit. In one embodiment, an anchor plate is couple to the post unit via a foot unit. In another embodiment, an anchor plate is coupled to a post unit via a post flange or via an L-bracket.

These and other embodiments are described with respect to the following drawings. However, the invention itself is not limited to these embodiments, but is defined only by the claims.

BRIEF DESCRIPTION OF THE DRAWINGS

For purposes of illustration only, several aspects of particular embodiments of the invention are described by reference to the following figures.

FIG. 2 further illustrates an extended nut for use with the illustrated top rail.

FIGS. 5a-5d illustrate various cross section views of the top rail of FIG. 2.

FIG. 8 illustrates the corner urine guard unit of the embodiment of FIG. 1 and also illustrates an additional urine guard side panel unit.

FIG. 22 is a top view of the embodiment of FIG. 21.
FIG. 23 is a front view of the embodiment of FIG. 21.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the invention is not intended to be limited to the embodiments shown, but is to be accorded the widest scope consistent with the principles and features disclosed herein.

Figure 1:
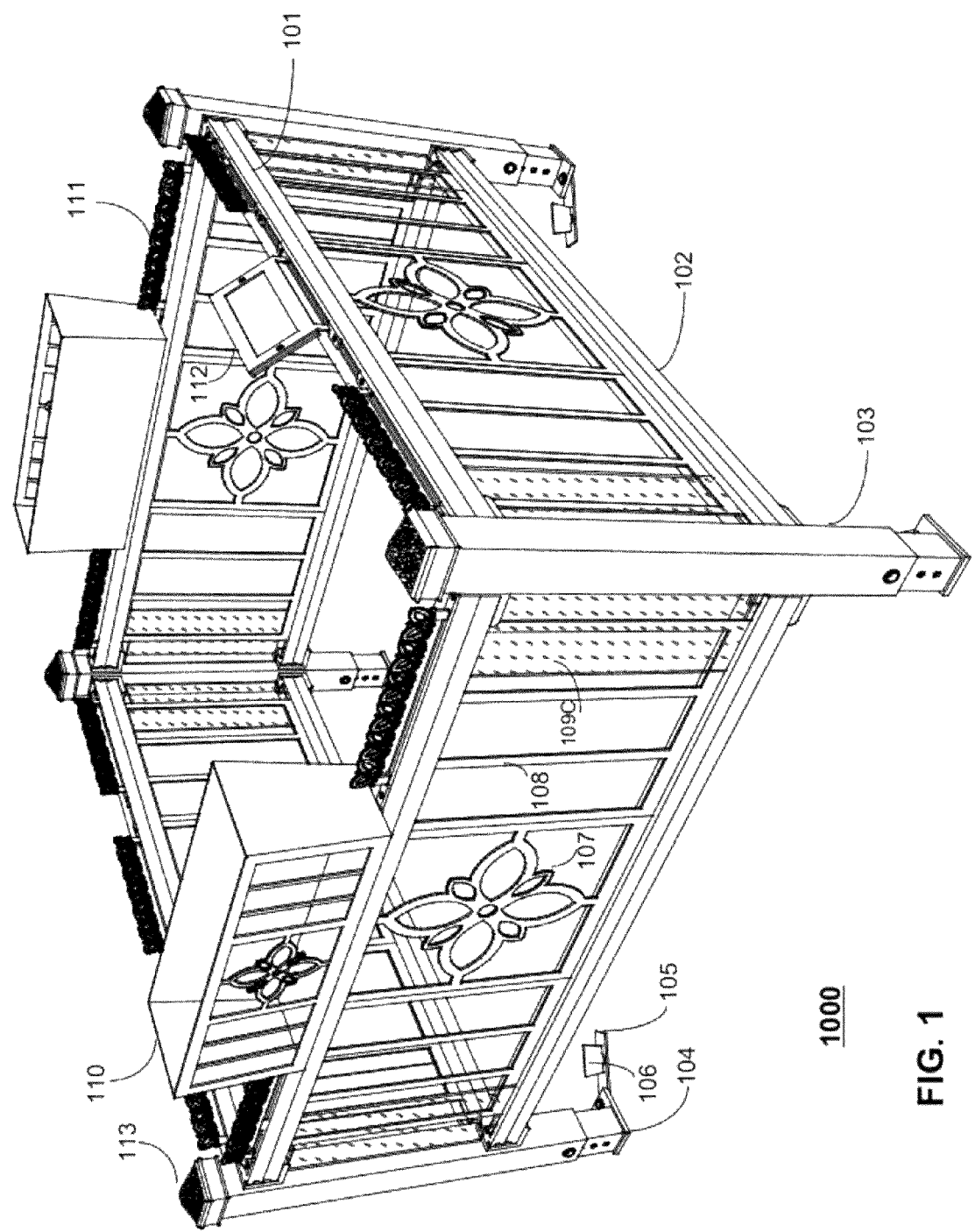
FIG. 1 illustrates a tree guard consistent with an embodiment of the present invention.

FIG. 1 illustrates a tree guard 1000 consistent with an embodiment of the present invention. Tree guard 1000 comprises a modular assembly including top rails 101, bottom rails 102, side panels 107 and 108, corner urine guard panels 109C, corner post units 103, post cap 113, adjustable feet 104, pivoting anchor plate 105, and a variety of top rail accessories including planters 110, sit spikes units 111, and dedication sign 112. FIG. 1 further illustrates stake 106 for securing anchor plate 105 to a ground location in a tree pit. As used herein, the term "tree guard" will be used to refer to guards used for trees and to guards used for protecting small gardens that may include trees and/or other plants. Specifically, for ease of description, the term tree guard will be used to cover any such structure, whether that structure is to be used to protect trees or whether it is to be used to protect gardens with plants other than trees. Also, for ease of description, the term "tree pit" will be understood herein to include any soft ground area marked off from a surrounding or adjacent hard ground (e.g. concrete or other sidewalk) area whether that soft ground area is for trees or for other plants.

Various materials may be used for the illustrated components of tree guard 1000. However, in a preferred embodiment, rails 101 and 102 are made of higher elasticity materials than are side panels 107 and 108 and top rail accessories 110, 111, and 112. In one embodiment, rails 101 and 102 are made of 6005A-T5 aluminum and posts 103 are made of 6063-T6 aluminum.

Figure 2:
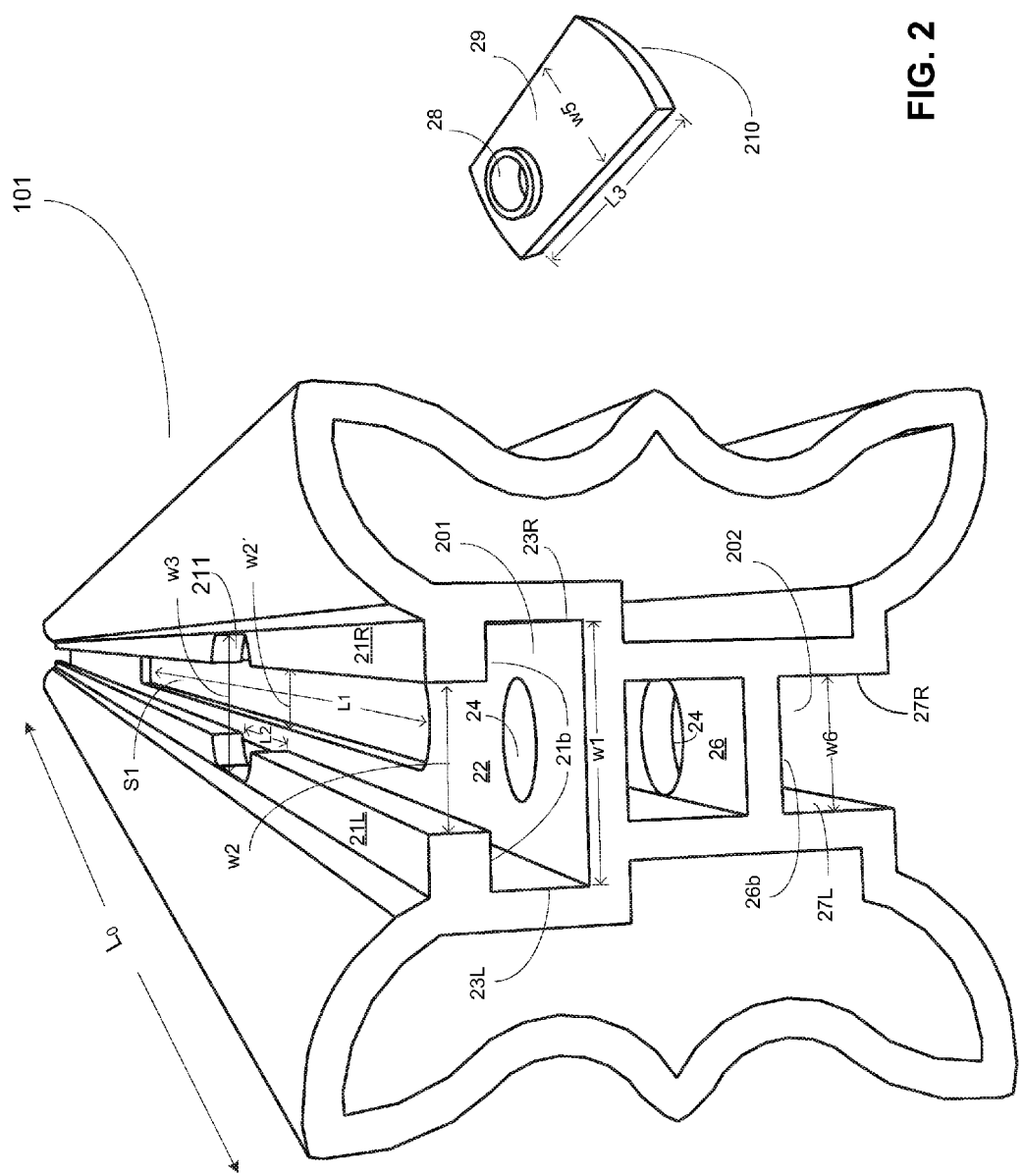
FIG. 2 illustrates further details of a perspective view of a portion of a top rail of the embodiment of FIG. 1.

FIG. 2 illustrates further details of a perspective view of a portion of a top rail 101 of the embodiment of FIG. 1 and further illustrates an extended nut 210 for use with top rail 101 to facilitate easy and flexible attachment of top rail accessories and/or to secure installed side panel inserts. Top rail 101 is consistent with an embodiment of the present invention.

Top rail 101 is formed to include a top groove 201 that runs along a length dimension $L_O$ of top rail 101 and has a width w1. Top rail 101 is further formed such that lips 21L and 21R overhang a portion of groove 201 such that top groove 201 is bounded by surface 22, left inner wall 23L, right inner wall 23R and the bottom sides 21b of lips 21L and 21R. Top rail 101 is further formed to include a bottom groove 202 that also runs along dimension $L_O$ and has a width w6. Bottom groove 202 is bounded by left wall 27L, right wall 27R, and bottom side 26b of surface 26. Top rail 101 is further formed to include a slot S1 through surface 22 and 26 to facilitate introduction of side panels as further described in the context of other figures herein. Slot S1 has a length L1 and a width w2'. In the illustrated example, width w2' is equal to width w2 between lips 21L and 21R. However, in alternative embodiments, widths w2 and w2' may be different. In a preferred embodiment, width w1 is equal or substantially equal to 0.531 inches; width w2 is equal or substantially equal to 0.281 inches; width w6 is equal or substantially equal to 0.281 inches; and length L1 is equal or substantially equal to 12.281 inches.

Extended nut 210 includes extended body 29 and threaded hole 28. Hole 28 is designed to receive a bolt or similar threaded male fastener member. In one embodiment, extended nut 210 is a commercially available weld nut such as part number 38144 available from Fastenal® Company (www.fastenal.com). Body 29 of extended number has a width w5 and a length L3.

In the illustrated example, a widened region 211 between lips 21L and 21R of top rail 101 is provided to facilitate easier introduction of extended nut 210 into groove 201. Region 211 has a length L2 and a width w3. In this example, width w3 is equal to width w1. However, in alternative embodiments, width w1 and w3 may be different. In this example, width w2 of the space between lips 21L and 21R is preferably less than width w5 of extended nut 210 and width w1 is at least slightly greater than width w5. Such an arrangement allows extended nut 210 to be easily positioned at a selected place along top groove 201 to help secure top rail accessories along top rail 101 as will be further described in the context of subsequent drawings. Moreover, length L2 of widened region 211 is preferably at least slightly longer than length L3 of extended nut 210. In a preferred embodiment, width w1 and w3 are equal or substantially equal to 0.531 inches; width w5 is equal or substantially equal to 0.500 inches; length L2 is equal or substantially equal to 1.156 inches; and length L3 is equal or substantially equal to 0.8125 inches.

While widened region 211 is present in a preferred embodiment to facilitate introduction of extended nut 210 in top groove 201, in alternative embodiments, a widened region such as region 211 may be smaller or absent. In such embodiments, a user may still introduce extended nut 210 into groove 201 by, for example, orienting nut 210 on its side relative to groove 201 (i.e., such that the plane of its main surface is perpendicular or otherwise non-parallel to surface 22) and then, after introducing nut 210 into groove 201, changing the orientation of extended nut 210 so that its main surface is parallel to surface 22, as will be appreciated by one skilled in the art.

Top rail 101 is further formed to include holes 24 through surfaces 22 and 26 for purposes of introducing a bolt to attach top rail 101 to an L-bracket that is in turn attached to a post unit 103 (post unit 103 and associated L-bracket shown in other figures but not separately shown in FIG. 2). For ease of illustration, holes 24 at one end of rail 101 are shown. Those skilled in the art will appreciate that such holes would also be present at another end of rail 101 to attach to an L-bracket of another post unit, but such other holes are not separately shown in FIG. 2.

Figure 3:
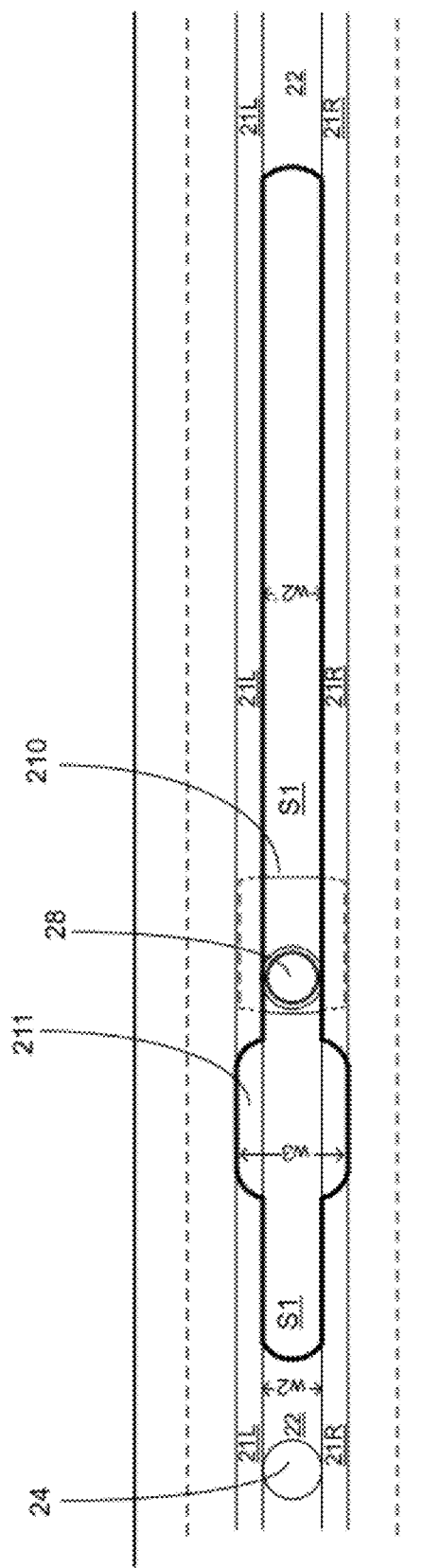
FIG. 3 is a top plan view of the top rail of FIG. 2 with the extended nut illustrated in FIG. 2 inserted into a top-side groove of the top rail.

FIG. 3 is a top plan view of top rail 101 with extended nut 210 inserted into groove 201 and positioned under lips 21L and 21R and above surface 22. Note that from this view, the part of surface 22 that is under lips 21L and 21R is hidden; also, slot S1 forms a gap in surface 22. As shown, width w2, which is the space between lips 21R and 21L, is preferably equal to or greater than a diameter of threaded hole 28 of extended nut 210. This allows a bolt (not separately shown) to be introduced and fastened into hole 28 through the gap between lips 21L and 21R. Such a bolt is used in conjunction with extended nut 210 to secure top rail accessories as will be shown and described in the context of other figures. Even if no top rail accessories are used, extended nut 210 can be secured with a bolt to "lock in" side panels that have been put in place through slot S1. Specifically, by blocking a portion of the gap between lips 21L and 21R above slot S1, a secured extended nut 210 can prevent easy removal of side panels through slot S1 after they have been installed as will be shown and described in the context of other figures.

Figure 4:
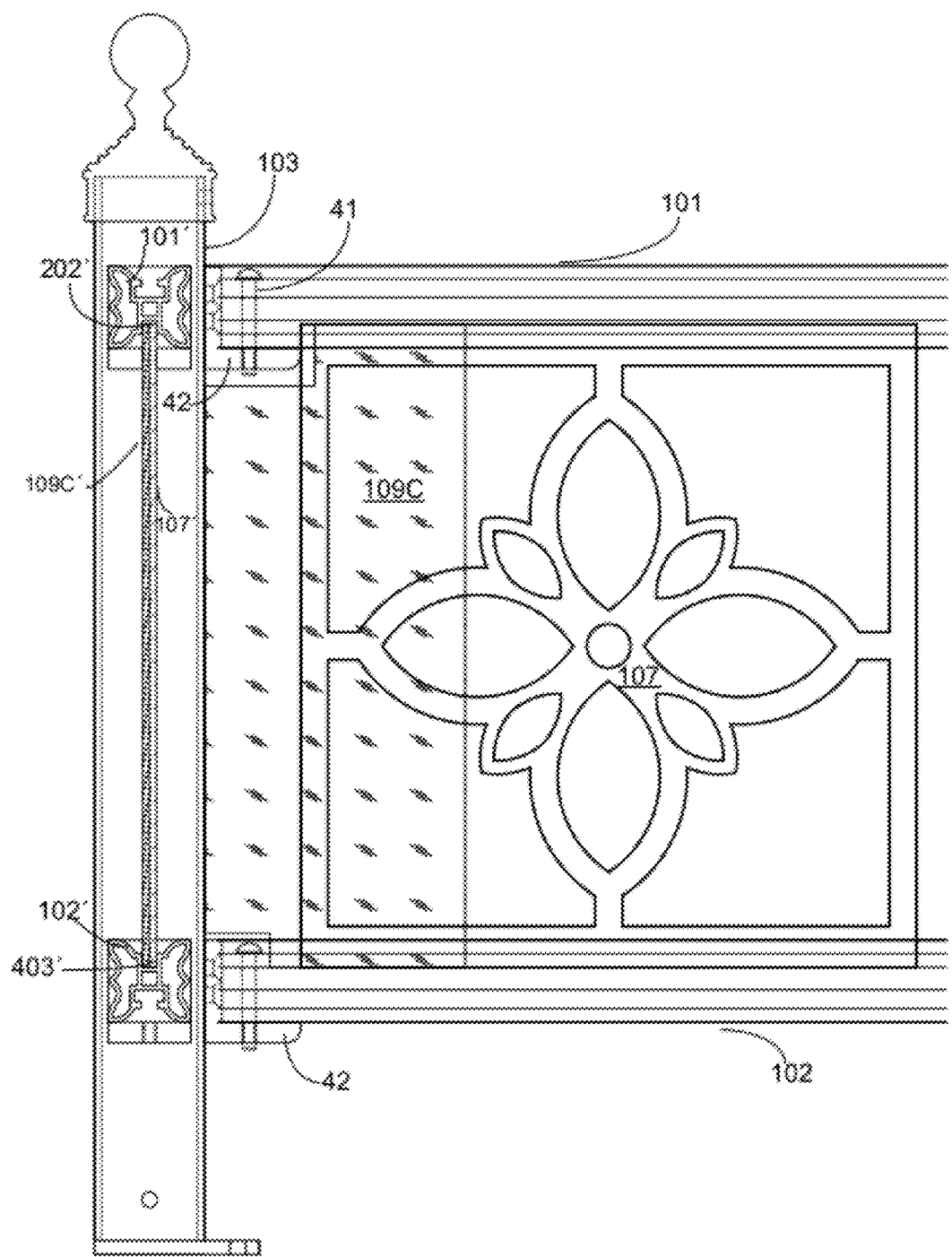
FIG. 4 illustrates further aspects of the embodiment of FIG. 1 including attachment of top and bottom rails to a corner post and overlapping placement of side panel and corner urine guard units in top and bottom rail grooves.

FIG. 4 illustrates further details of the post, rail, and side panel assembly of tree guard 1000 of FIG. 1. L-brackets 42 are secured to, respectively, a top portion and a bottom portion of corner post 103 and L-brackets 42 are also secured to, respectively, top rail 101 and bottom rail 102. Top rail 101 and an L-bracket 42 are secured to each other using bolt 41 which is introduced through holes 24 in top rail 101 (holes 24 shown in FIGS. 2 and 3). A similar assembly is used to secure bottom rail 102 to post 103 as shown.

For purposes of explanation, FIG. 4 shows two corner urine guard units and two side panel units as well as two top rail units and two bottom rail units. A first top rail unit 101 and a first bottom rail unit 102 are shown with their long dimension parallel with the plane of the page. A second top rail unit 101' and a second bottom rail unit 102' are shown in cross section, oriented such that their long dimension is perpendicular to the plane of the page. A first side panel unit 107 and a first corner urine guard unit 109C are shown with their primary surfaces in (i.e. parallel with) the plane of the page. Second side panel unit 107' and second corner urine guard 109C' are shown with their primary surfaces perpendicular to the plan of the page. Side panel unit 107 and corner urine guard unit 109C are held in a bottom-side groove 202 of top rail 101 and a top-side groove (not separately shown) of bottom rail 102. Side panel unit 107' and corner urine guard unit 109C' are held in a bottom-side groove 202' of top rail 101' and a top-side groove 403' of bottom rail 102'. In the illustrated example, top side groove 202' in top rail 101' and bottom side groove 403' in bottom rail 102' (as well as comparable grooves in rails 101 and 102) have a width dimensioned to support overlapping placement of side panel unit 107' and corner urine guard 109C' (and, with respect to grooves in rails 101 and 102, side panel until 107 and corner urine guard 109C). In one embodiment, this arrangement allows decorative aspects of a side panel unit to be visible in the region of a transparent corner urine guard unit. In other embodiments, similar grooves may be narrower such that a single side panel unit may be more securely held in the absence of an overlapping corner urine guard unit. In such alternatives, a corner urine guard unit and decorative side panel unit would be placed in a non-overlapping fashion within rail grooves. However, those skilled in the art will appreciate for embodiments in which a groove is dimensioned to contain up to two over lapping side panel units, it may be desirable, for better securing of a side panel unit, to provide spline for use when only one side panel is positioned in such a groove.

In some embodiments, it may be desirable to provide for side panels that are thicker than the side panels illustrated herein. Although in one embodiment described above that supported overlapping side panels within a groove, a groove thickness for bottom side groove 202 of top rail 101 is described to be equal or substantially equal to 0.281 inches, it may be describable in alternative embodiments to provide a slightly wider groove if thicker side panels are desired for reasons of durability and sturdiness. Note that in some embodiments, a top side groove of a bottom rail (such as top side groove 403' of bottom rail 102') and a bottom side groove 202 of a top rail 101 have widths that are substantially equal.

FIGS. 5a-5d show cross section views at various points along top rail 101 of FIG. 2. FIG. 5a shows a cross section through rail 101 at a point (along dimension $L_O$) prior to or beyond slot S1. FIG. 5b shows a cross section through rail 101 at a point along slot S1 but prior to or beyond widened region 211. FIG. 5c shows a cross section through rail 101 at a point along slot S1 within widened region 211. FIG. 5d shows a cross section through rail 101 at the center of hole 24. Also shown in this view is a bolt 41 securing top rail 101 onto an L-bracket 42 which is secured to a post unit 103 (post unit 103 not separately shown) (only the lower portion of L-bracket 42 is shown because this is a cross section view).

Figure 6:
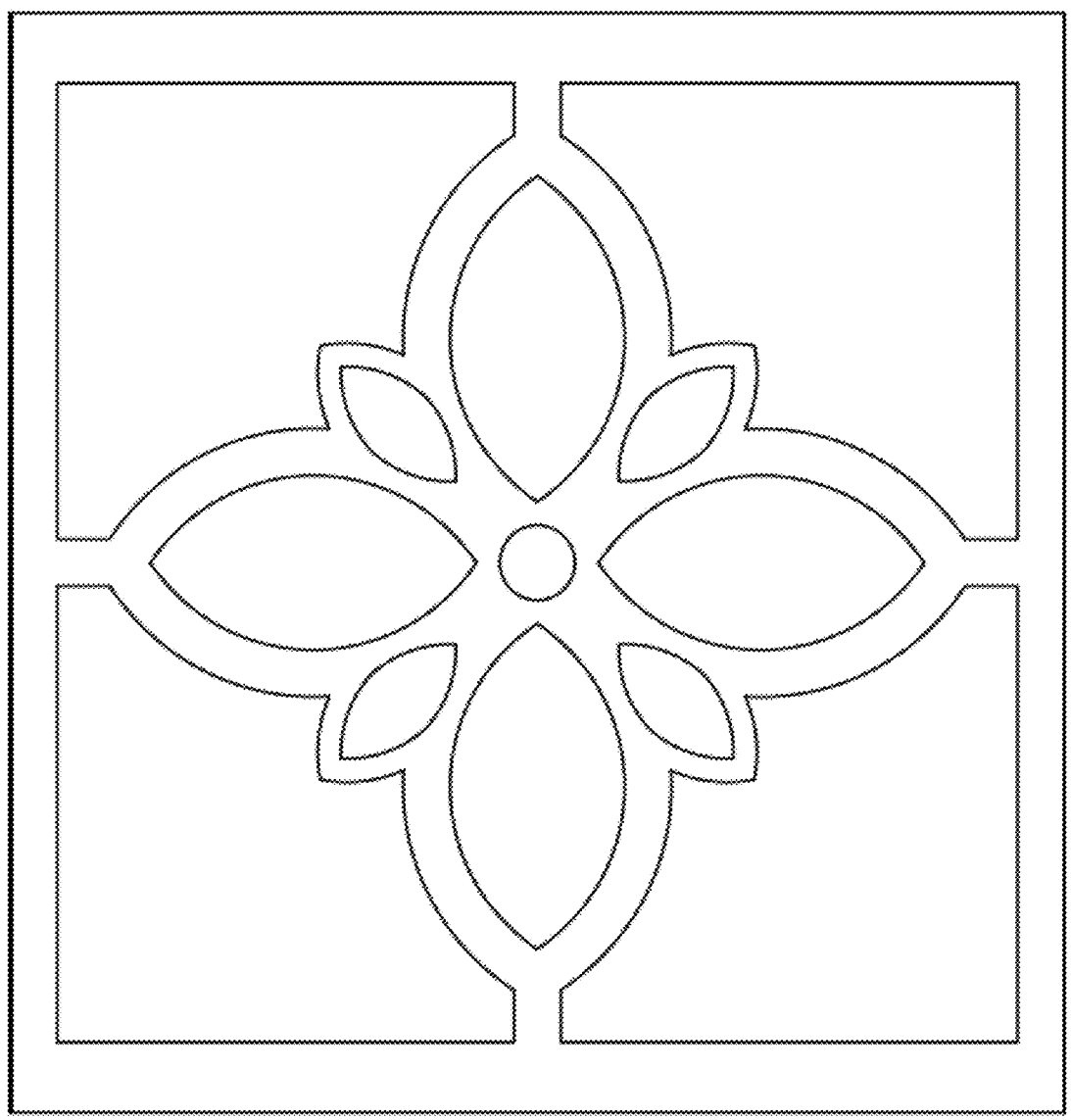
FIG. 6 illustrates a side panel unit of the embodiment of FIG. 1.

FIG. 6 illustrates a single side panel insert 107 of the tree guard assembly 1000 of FIG. 1.

Figure 7A:
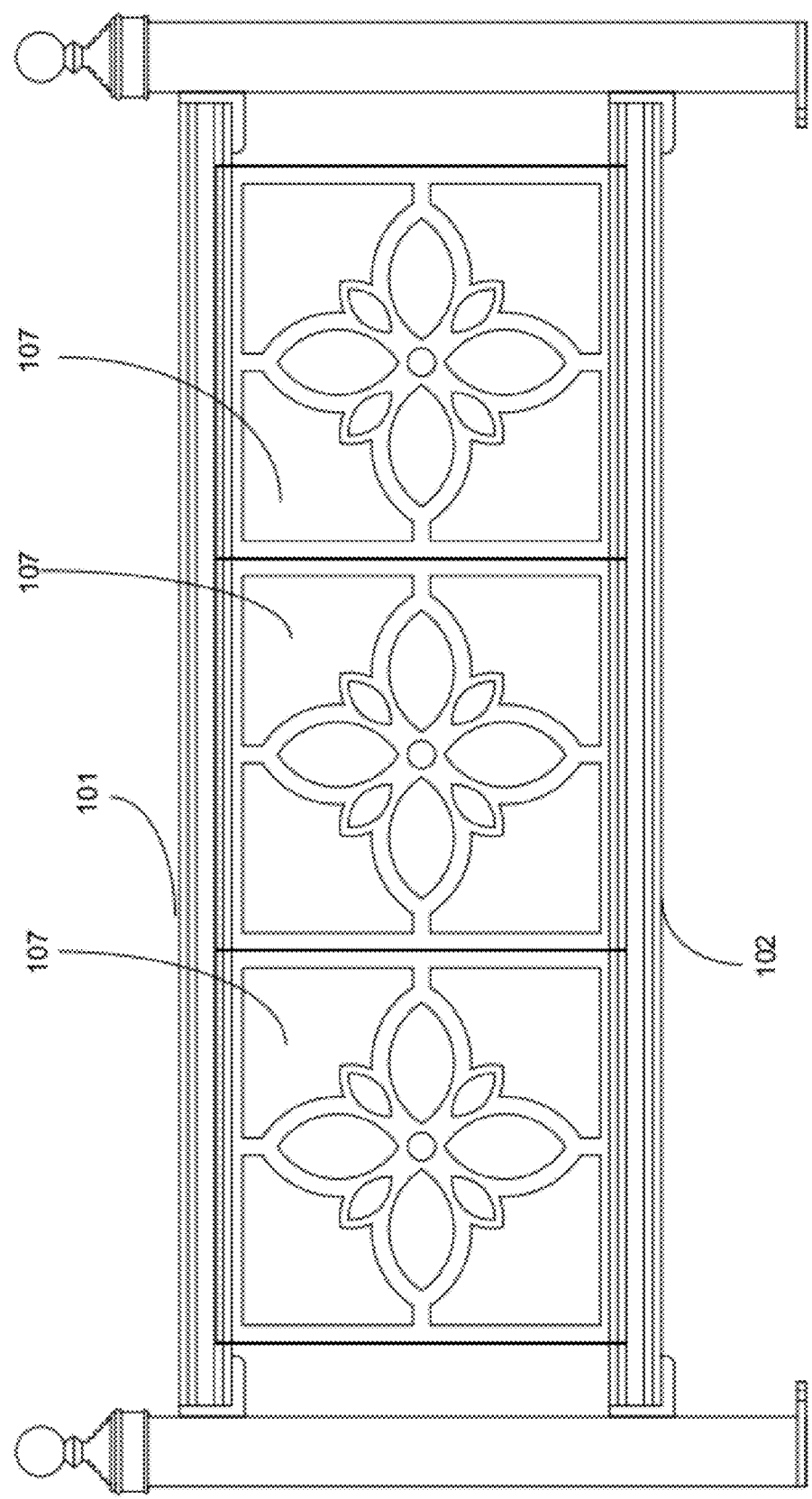
FIG. 7a illustrates a plurality of side panel units of the type shown in FIG. 6 installed adjacently in a tree guard consistent with one embodiment of the present invention.

FIG. 7a is a front plan view of a tree guard assembly with three side panel units 107 installed adjacently to each other. With reference to FIG. 2 and FIG. 3, each of the side panel units 107 shown in FIG. 7 may be installed in a tree guard unit 1000 that is already otherwise assembled by introducing them through (with reference to FIGS. 2-3) a slot S1 in top rail 101 and then sliding each along a top-side bottom rail groove (such as groove 403' in bottom rail 102' illustrated in FIG. 4) and bottom side top rail groove (such as groove 202' in top rail 101' illustrated in FIG. 4, or groove 202 illustrated in FIG. 2) until each side panel unit 107 is in the desired position. The panels may then be secured using extended weld nut 210 and a bolt to obstruct slot S1 as illustrated in FIG. 3. Also, although the view in FIG. 7a shows only side panels 107, the embodiment of FIG. 1 illustrates that panels with different decorative design types may be used together. As shown in FIG. 1, a first decorative design is formed in panels 107 and a second decorative design is formed in panels 108.

Figure 7B:
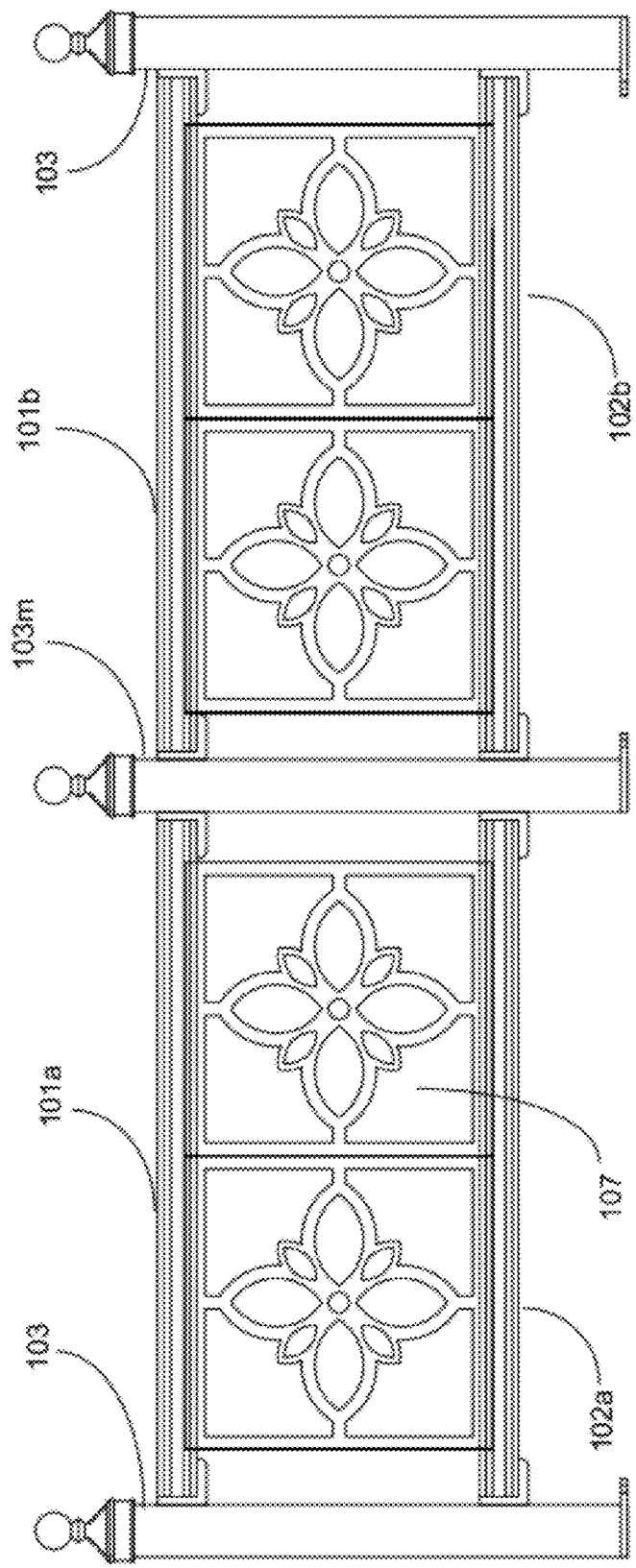
FIG. 7b illustrates an alternative embodiment consistent with aspects of the present invention in which a middle post is coupled between two top rails and two bottom rails.

FIG. 7b illustrates an alternative embodiment consistent with aspects of the present invention in which a middle post is included between two top rails and two bottom rails. Specifically, as shown in FIG. 7b, a middle post 103m is coupled between top rails 101a and 10b and between bottom rails 102a and 102b. The illustrated top and bottom rails are also coupled to corner posts 103 as shown. In this embodiment, each corner post 103 is adapted to couple rails at 90 degree angles (as illustrated in FIG. 1) and a middle post 103m is adapted to couple rails (e.g., top rail 101a and 101b) at 180 degree angles (as illustrated in FIG. 7b).

In one embodiment, a variety of rail lengths are provided for flexibility in assembling a tree guard with appropriate side lengths. In one embodiment, side lengths longer than about 5 feet (5') are preferably accommodated by joining two or more rails with one or more middle posts along a side of a tree guard assembly. In one embodiment, the following length rails are optionally provided for user selection: 19⅜ inches (19⅜") (this length plus two corner posts makes the total side length 2.0 feet long); 25⅜" (this length plus two corner posts makes the total side length 2.5 feet long); 31⅜" (this length plus two corner posts makes the total side length 3.0 feet long); 37⅜" (this length plus two corner posts makes the total side length 3.5 feet long); 43⅜" (this length plus two corner posts makes the total side length 4.0 feet long); 49⅜" (this length plus two corner posts makes the total side length 4.5 feet long); and 55⅜" (this length plus two corner posts makes the total side length 5.0 feet long). A user may select one or more of the above rail lengths and use the corresponding rails in conjunction with corner post units only or may use one or more middle posts on a side in conjunction with a plurality of top rails and bottom rails on a side of a modular tree guard assembly.

FIG. 8 illustrates corner urine guard unit 109C which may be installed to protect against urine near corners of tree guard 1000 as illustrated in FIG. 1 and FIG. 4. FIG. 8 further illustrates a urine guard unit 109A which may, if desired, be installed elsewhere along a side of tree guard 1000. For example, a urine guard unit such at 109A may be installed overlapping with, adjacent to, or in place of a side panel unit 107 illustrated in, for example, FIG. 7a. Corner urine guard unit 109C and urine guard unit 109A may be installed and positioned in a manner similar to that described above in the context of side panel units 107 of FIG. 7. Urine guard unit 109A and corner urine guard unit 109C are preferably made of a durable transparent and urine resistant material such as the polycarbonate material of Palgard™, available from Palram Industries Ltd (see www.palram.com).

Figure 9:
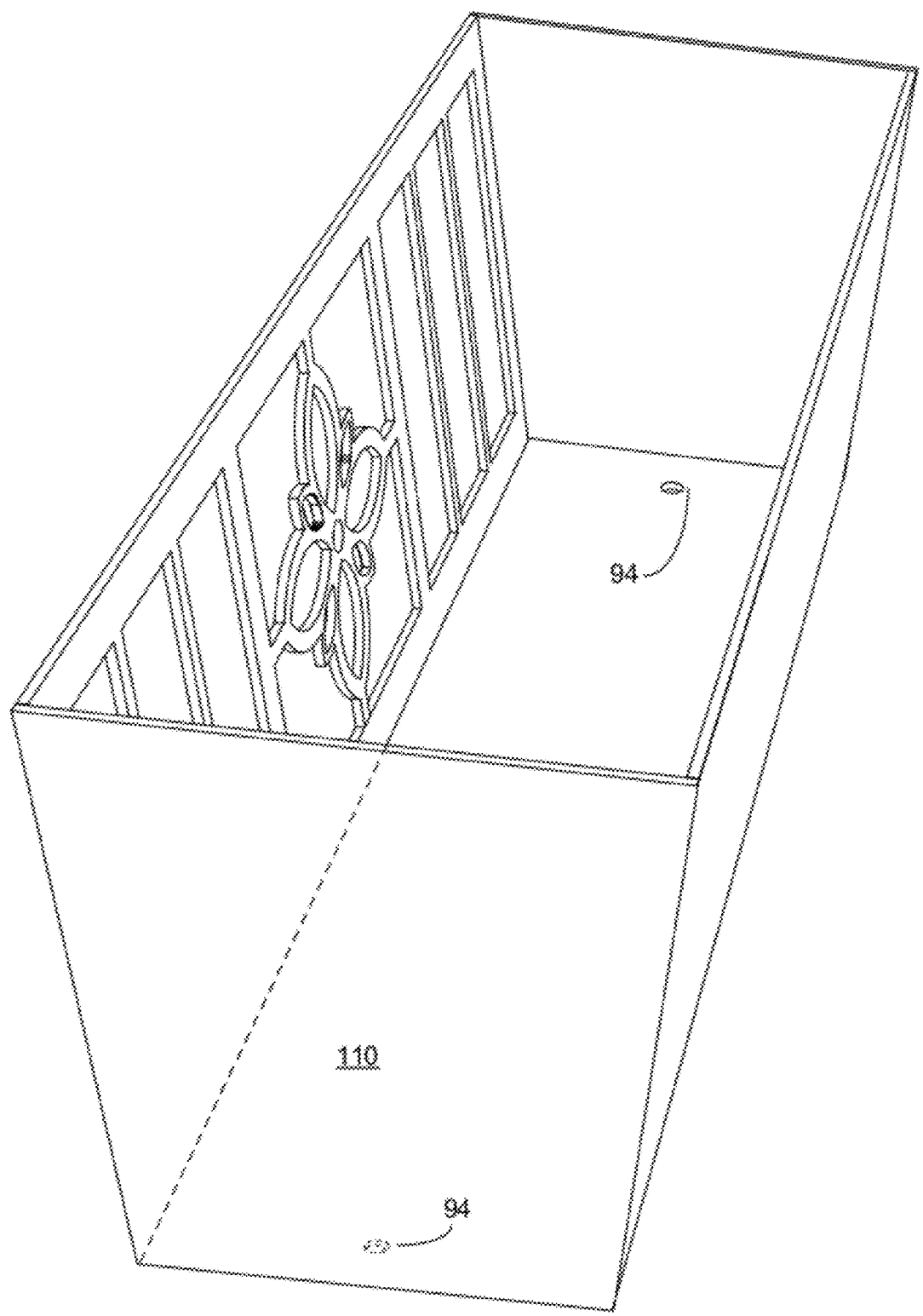
FIG. 9 illustrates a first top rail accessory (planter box) of the embodiment of FIG. 1.

FIG. 9 illustrates planter box 110 of the embodiment of FIG. 1. Planter box 110 includes holes 94 to facilitate installation as a top rail accessory as further described above and in the context of FIG. 10 below.

Figure 10:
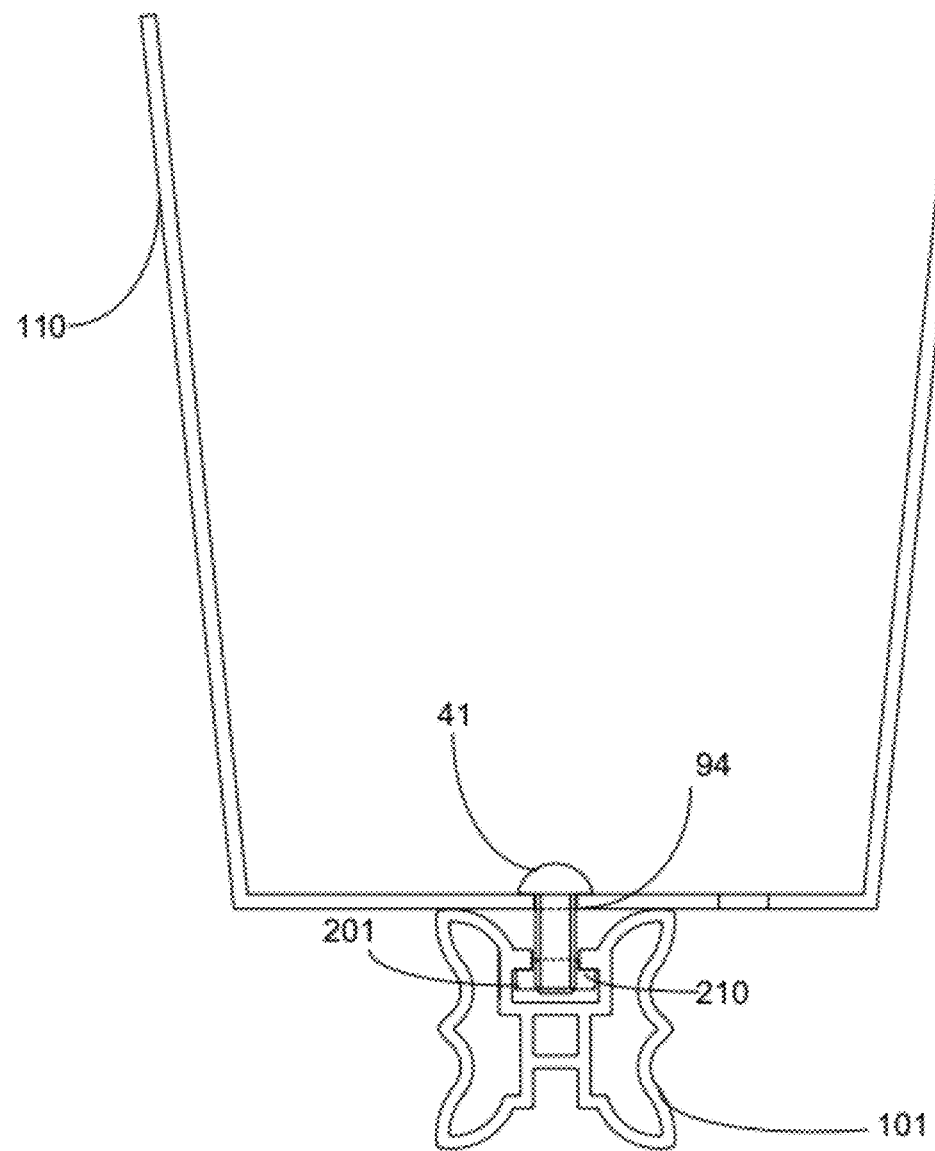
FIG. 10 illustrates the accessory of FIG. 9 installed on a top rail of the embodiment of FIG. 1.

FIG. 10 illustrates installation of top rail accessory 110 in further detail. Specifically, planter box 110 is secured above top rail 101 by fastening bolt 41 through hole 94 and into extended nut 210 which has been positioned within top-side groove 201 (beneath lips 21L and 21R, see FIGS. 2-3) at a desired location along top rail 101.

Figure 11:
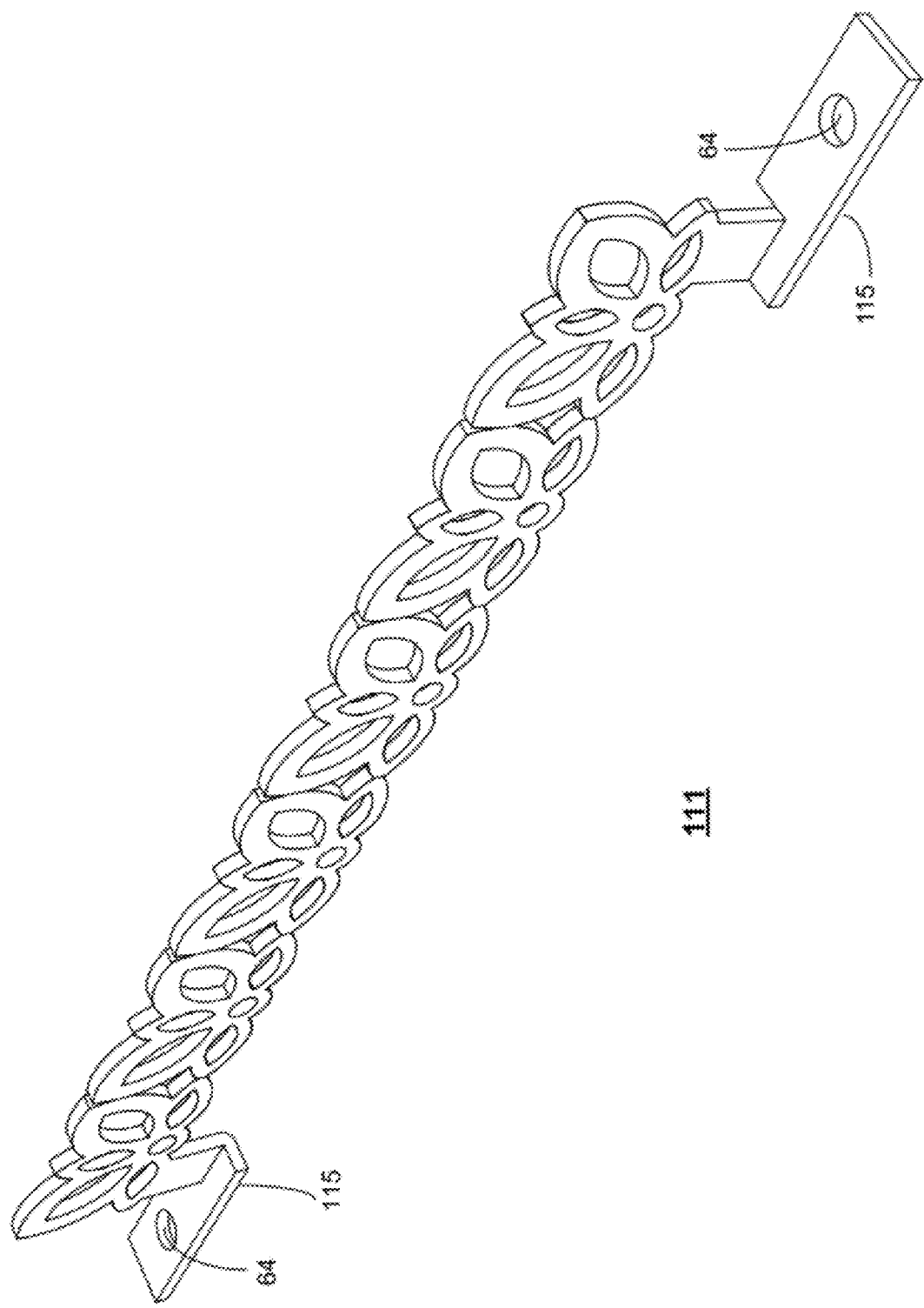
FIG. 11 illustrates a second top rail accessory (sit spikes unit) of the embodiment of FIG. 1.

FIG. 11 illustrates a different top rail accessory, sit spikes unit 111 of the embodiment of FIG. 1. Sit spikes unit 111 includes base portions 115 which in turn include holes 64 to facilitate installation as a top rail accessory on top rail 101 in a manner similar to that described for top rail accessory 112 in the context of FIG. 13 below.

Figure 12:
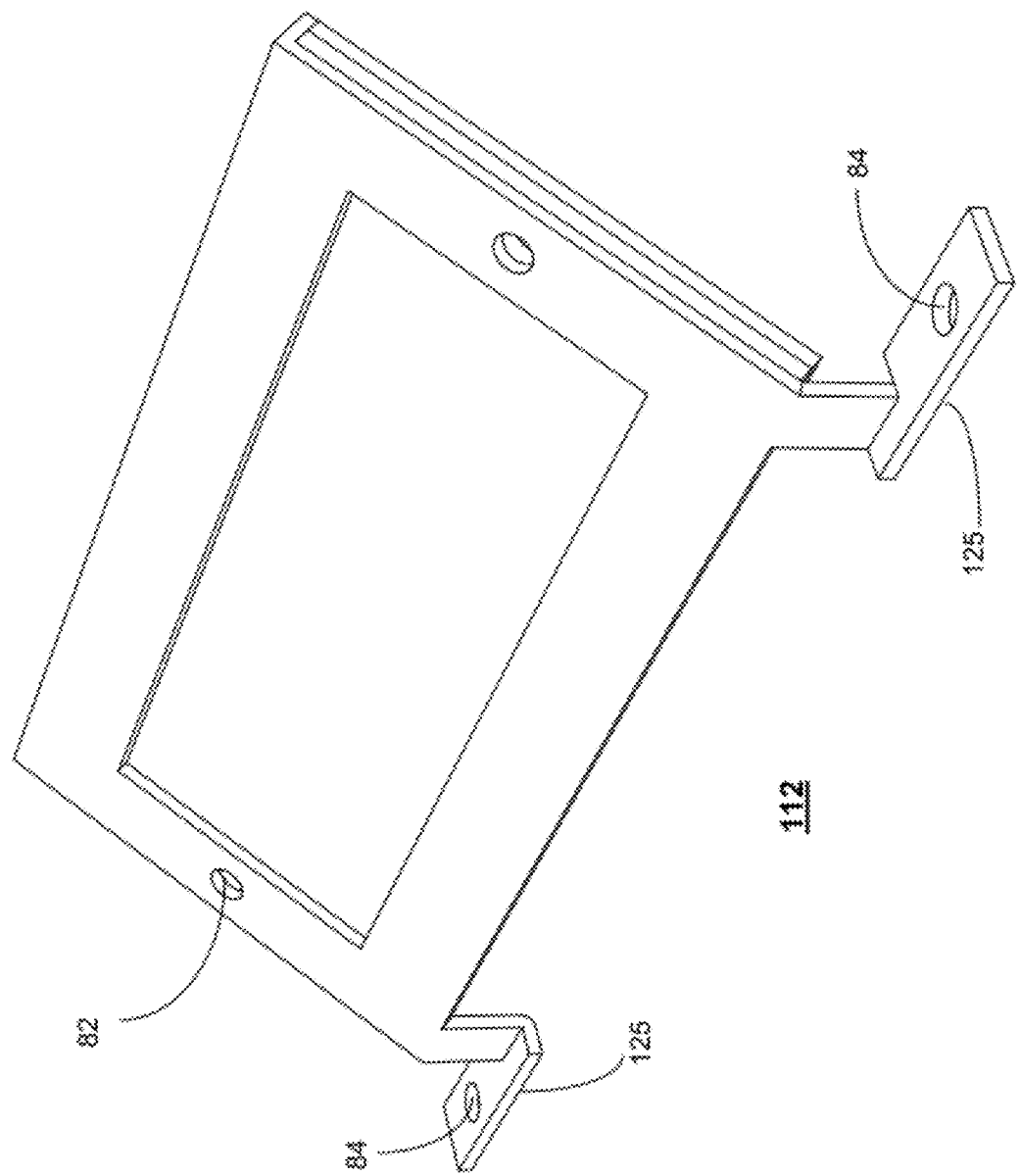
FIG. 12 illustrates a third top rail accessory (sign holder unit) of the embodiment of FIG. 1.

FIG. 12 illustrates another top rail accessory, sign holder 112 of the embodiment of FIG. 1. Sign holder 112 includes base portions 125 that in turn include holes 84 to facilitate installation as a top rail accessory on top rail 101 in a manner similar to that described for top rail accessory 110 in the context of FIG. 10. Sign holder 112 also includes holes 82 that may be used to receive a fastener bolt for secure a dedication or sponsorship sign in sign holder 112.

Figure 13:
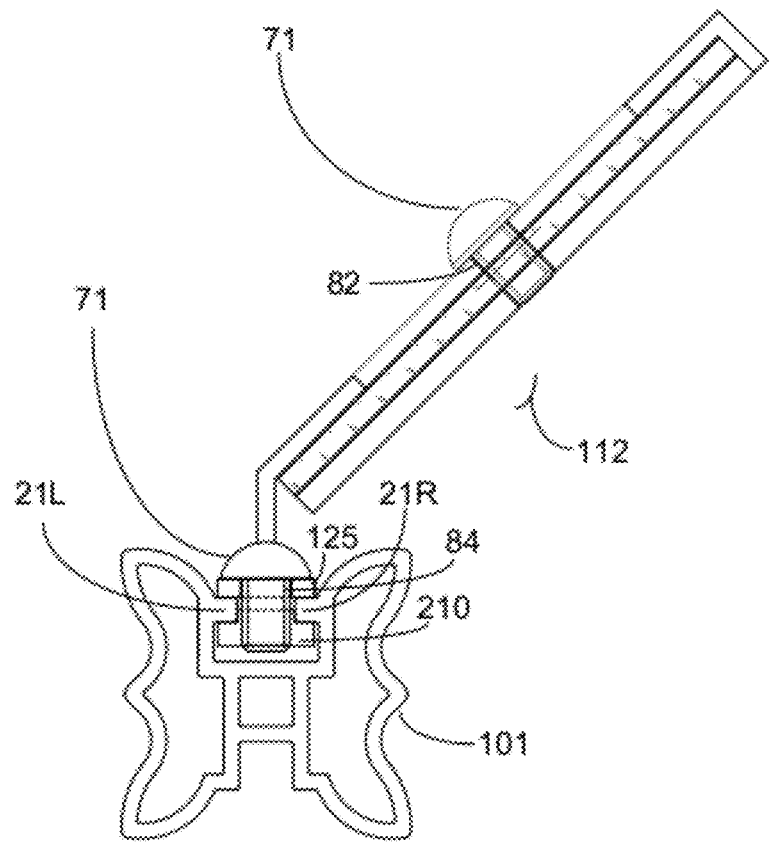
FIG. 13 illustrates the accessory of FIG. 12 installed on a top rail of the embodiment of FIG. 1.

FIG. 13 illustrates installation of sign holder 112 in further detail. Specifically, sign holder 112 is secured to top rail 101 by fastening bolt 71 through a hole 84 and into extended nut 210 which has been positioned within top-side groove 201 (beneath lips 21L and 21R) at a desired location along top rail 101. Note that in the case of sign holder 112, the base 125 can be secured directly on top of lips 21L and 21R.

Figure 14:
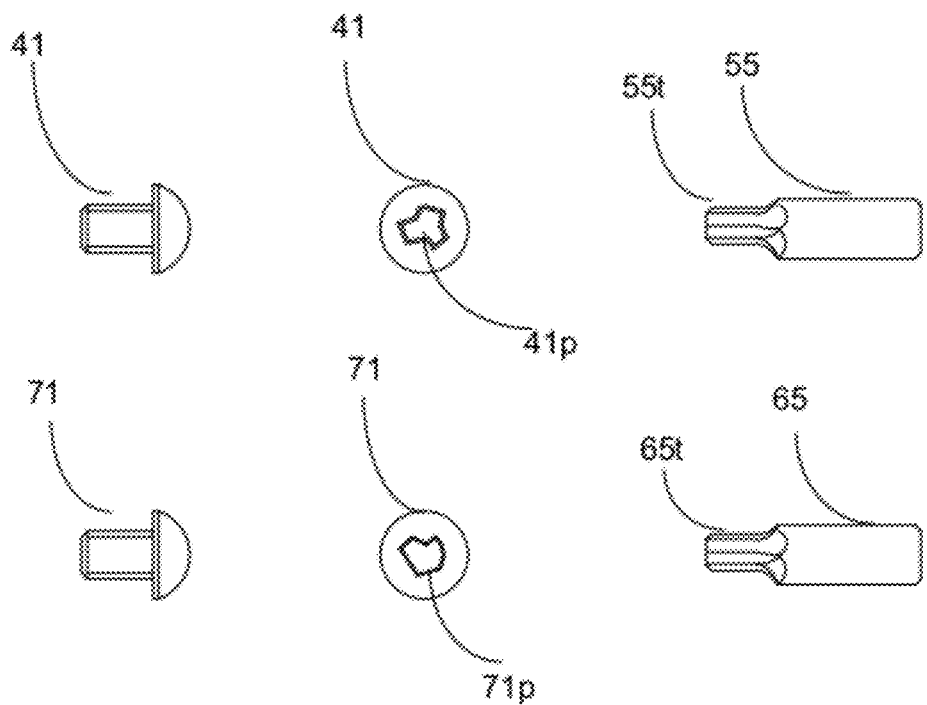
FIG. 14 illustrates different types of tamper-proof bolts that may be used in assembling and securing various aspects of the embodiment of FIG. 1.

FIG. 14 illustrates secure bolts 41 and 71 and corresponding locking bits 55 and 65 for use in conjunction with embodiments described herein. Bolt 41 has a first unique, non-standard screw head pattern 41p. Bolt 71 has a second unique, non-standard screw head pattern 71p. Bit 55 has a bit tip 55t that fits screw head pattern 41p of tamper proof bolt 41. Similarly, bit 65 has a bit tip 65t that fits screw head pattern 71p of tamper proof bolt 41. Thus, each tamper proof bolt and bit combination, with their corresponding unique screw head and bit tip patterns, act together as a lock and key so that bolts cannot be easily removed without the corresponding unique bit. Tamper proof bolts such as bolts 41 and 71 and corresponding bits such as bit 55 and 65 are, in one embodiment, commercially available.

In a first embodiment, tamper proof bolts with a first unique pattern, such as pattern 41p of bolt 41, are used to assemble various aspects of tree guard 1000 of FIG. 1. One result of such an embodiment is that it is difficult to dis-assemble and steal some or all of tree guard 1000. Tree guards are particularly needed in an urban environment. And, being exposed to frequent foot traffic, are at some risk of being stolen. Moreover, the inventive modular tree guard embodiment of FIG. 1 would, without the use of tamper proof bolts, would be potentially more vulnerable to theft than prior art tree guards formed by welding together iron pieces around a tree. However, such prior art tree guards lack the flexibility and modularity of inventive tree guard embodiment 1000 of FIG. 1.

In a second embodiment, a tamper proof bolt having a second unique pattern, such as pattern 71p of bolt 71, is used for attaching a dedication sign holder such as sign holder 112 of FIG. 12. In this second embodiment, the dedication sign holder is secured by tamper proof bolts having a unique screw head pattern that is different than the pattern of bolts used for assembling other parts of the tree guard. In one embodiment, such an arrangement addresses the challenge of motivating tree guard funding. For example, a city, non-profit, or other tree-promoting entity, may wish to encourage businesses or residential buildings to support tree guards and/or other costs associated with creating and maintaining tree pits in an urban area. In exchange for funding the tree guard (or other tree-related costs), a city or other entity may allow signage on the tree guard mentioning the tree guard sponsor. This may benefit a sponsor business by promoting goodwill toward that business and/or enhancing the business name recognition. Individuals may also wish to sponsor tree-related expenses in exchange for name recognition. However, the practicality of such an arrangement may be enhanced by allowing a tree-promoting entity (such as a city, neighborhood association, authorized non-profit, etc.) to have exclusive control over the content of signage placed on the tree guard. Therefore, although a business or other entity proximate to the tree might agree to have responsibility to assemble and install the tree guard (and therefore need access to tamper proof bolts such as bolts 41 with a first pattern 41p), it might be beneficial to allow a third party controlling entity (such as a city) to have exclusive access to tamper proof bolts (and corresponding bits) with a second unique pattern (such as pattern 71p of bolts 71). In one embodiment, such unique bolts are given only to a third party tree promoting entity for use in securing a sign in sign holder 112 through sign securing holes 82. In another embodiment, such unique bolts are also provided for use in securing the sign holder itself to the tree guard through holes 84 (for example, as illustrated in FIG. 13). In one embodiment, holes 82 and/or holes 84 are dimensioned to reject bolts 41 while accepting bolts 71. In such an embodiment, bolts 41 and 71 would have different diameters than each other.

In another alternative embodiment, signage may be provided as part of a side panel unit. In such an embodiment, a unique bolt such as bolt 71 may be provided to a third party tree-promoting entity for use in securing a signage side panel unit in conjunction with an extended nut to obstruct a slot such as slot S1 as previously described. In this embodiment, other extended nuts may be used in conjunction with bolts 41 (provided to a tree guard user) to install top rail accessories on a portion of a top rail groove not obstructed by the extended nut secured by a bolt 71 (which, in this embodiment, would be used for obstructing a slot to prevent removal of a signage side panel).

Figure 15C:
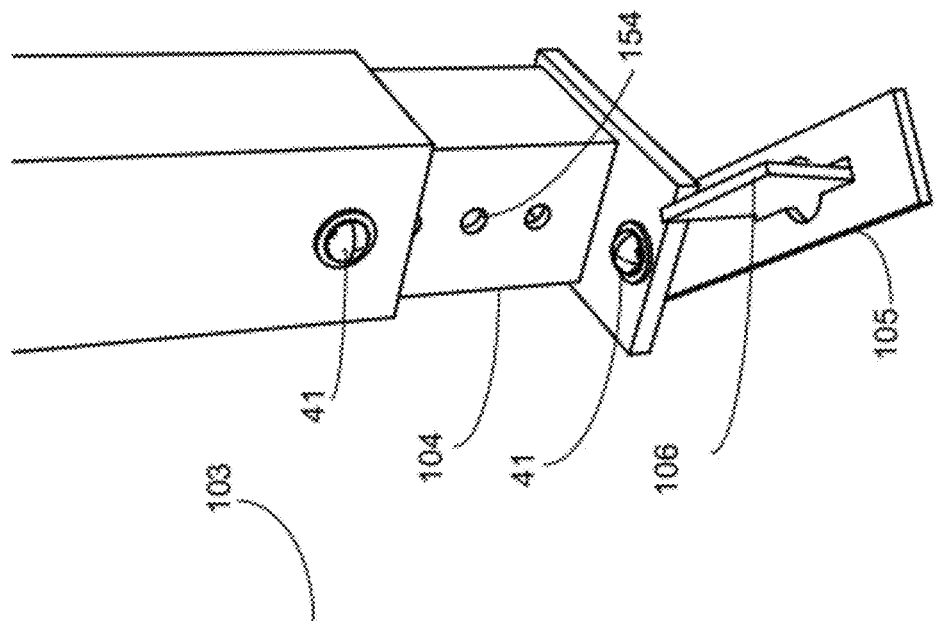
FIGS. 15a-15c illustrate the adjustable foot and pivoting anchor plate of the embodiment of FIG. 1.
Figure 15B:
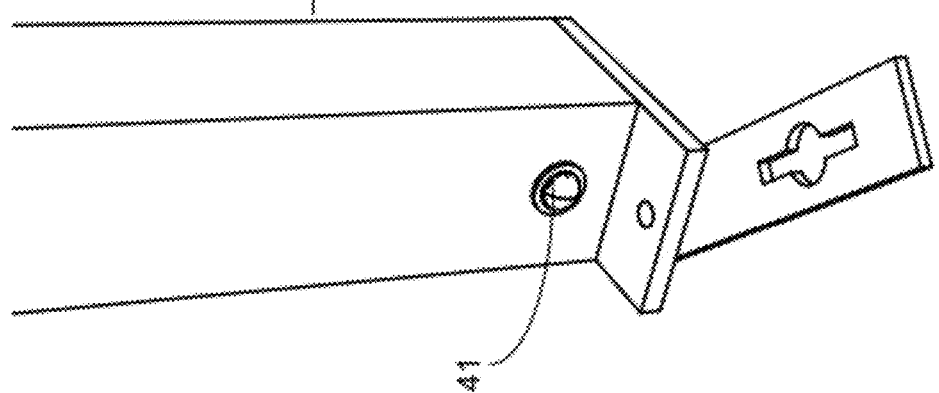
Figure 15A:
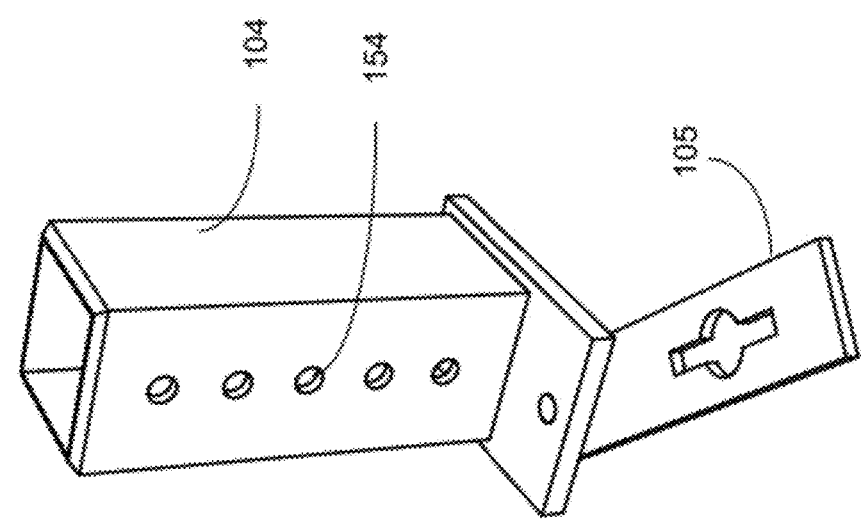

FIGS. 15a-15c illustrate adjustable foot 104 and pivoting anchor plate 105 of the embodiment of FIG. 1 in further detail. Tree pits, particularly in the urban environment, often have uneven surfaces due in part to the nature of tree roots being in a particularly confined environment. Moreover, tree roots and various urban ground obstructions within the pit and it can make it difficult to position a tree guard to find the best ground for inserting a stake to anchor the tree guard.

As show in FIG. 15a, adjustable foot unit 104 includes holes 154. As shown in FIGS. 15b-15c, post unit 103 can slide to a selected position on foot unit 104 and then a bolt 41 can be used to secure post unit 103 to foot unit 104 at a desired height above a ground of a tree pit. In FIG. 15b, post unit 103 has been slid down foot unit 104 to a lowest position before being secured to foot unit 104 by fastening a bolt 41 through a lowest hole 154. In FIG. 15c, post unit 103 has been slid part of the way down foot unit 104 to an elevated position before being secured by fastening a bolt 41 through an elevated hole 154. This allows an effective length (height) of a first post 103 fastened to a first foot unit 104 to be greater than an effective length of a second post 103 fastened to a second foot unit 104 in an embodiment such as shown in FIG. 1, thereby compensating for unevenness in the ground of a tree pit and enabling the tree guard to appear level around its top rails.

As shown in FIG. 15c, anchor plate 105 is moveably attached to foot unit 104 by bolt 153 so that it can pivot relative to foot portion 104. This allows anchor plate 105 to be pivoted to find the best ground in which to insert a stake such as stake 106, which is inserted through anchor plate 105 to secure it to the ground and thereby secure foot unit 104 to the ground.

Figure 15D:
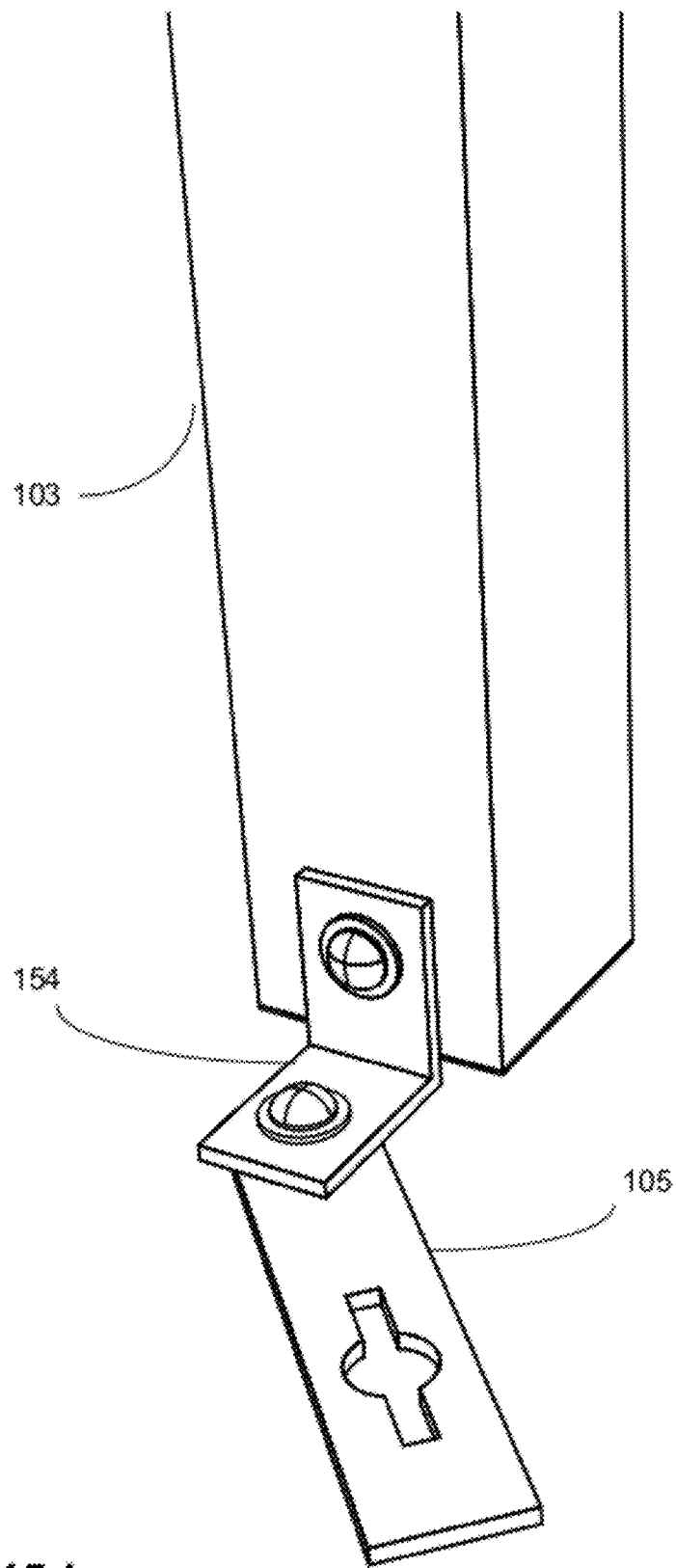
FIG. 15d illustrates an alternative embodiment in which the post and anchor plate of FIG. 1 and FIGS. 15a-15c are coupled via an L-bracket instead of via a foot unit.

FIG. 15d illustrates an alternative embodiment in which anchor plate 105 is coupled to post 103 via an L-bracket 154. In this embodiment, a separate foot unit may be provided but is not separately shown in FIG. 15d.

In the primary embodiments illustrated herein, a foot member and post member are separate units adapted to be coupled together. However, those skilled in the art will appreciate that the benefits of the illustrated anchor plate, which is movably coupled to a foot member in the embodiments illustrated in FIGS. 15a-15c, may be realized even if the foot member (to which the anchor plate is movably coupled) is integral with a corresponding post member. Therefore, in alternative embodiments, an anchor plate may be movably attached to a foot member that is integral with a post member without necessarily departing from certain aspects of an embodiment of the present invention. Moreover, in other embodiments, the anchor plate may be movably coupled to another element that is part of or integral with the post member such a flange member of the post. Such embodiment also will not necessarily depart from the spirit and scope of aspects of the present invention.

Figure 16:
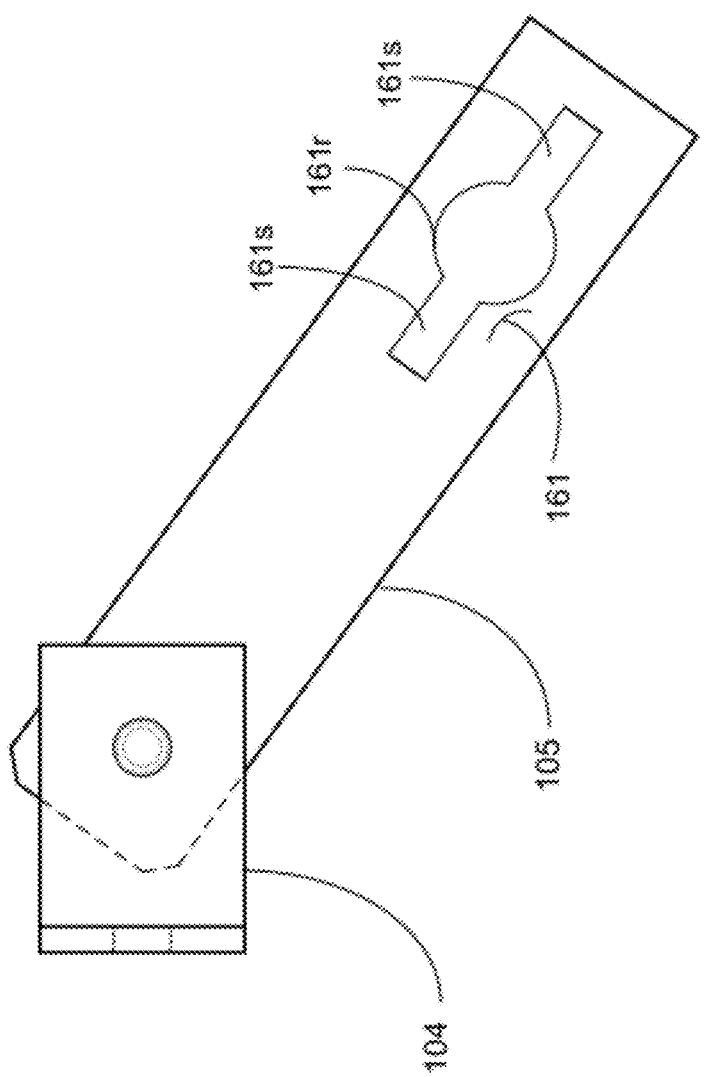
FIG. 16 is a top plan view of the anchor plate illustrated in FIG. 1 and FIGS. 15a-15d, in particular showing the stake opening of the anchor plate.

FIG. 16 illustrates further details of anchor plate 105. As shown in FIG. 16, anchor plate 105 in this embodiment is formed with an opening 161 for securing anchor plate 105 to the ground using a stake. Opening 161 is formed to accommodate a plurality of differently shaped stakes. In particular, opening 161 includes rectangular portions 161s and rounded portion 161r between rectangular portions 161s.

Figure 17A:
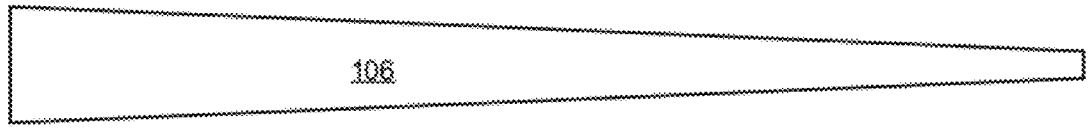
FIGS. 17a-17d illustrate different shaped stakes that may be utilized with the anchor plate illustrated in prior figures.
Figure 17B:
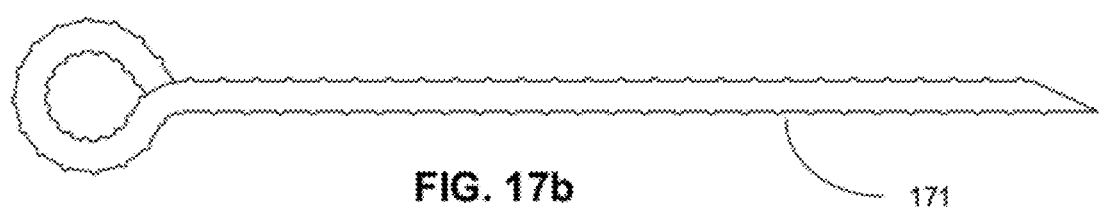
Figure 17C:
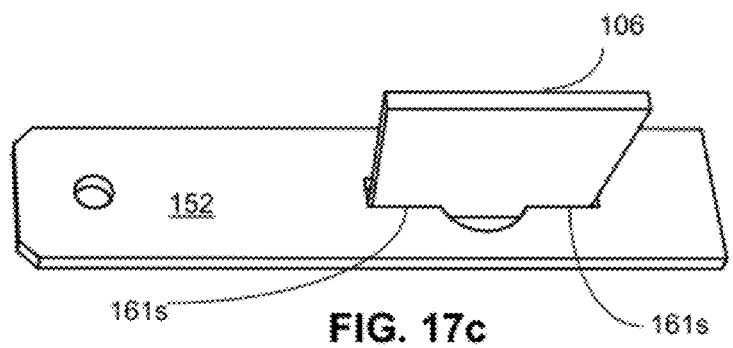
Figure 17D:
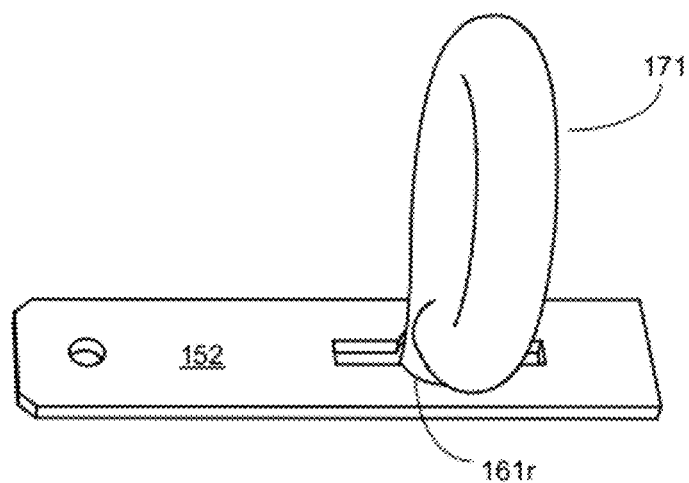

FIG. 17a illustrates tapered stake 106. FIG. 17b illustrates classic stake 171. As shown in FIG. 17c, tapered stake 106 may be utilized with anchor plate 105 by inserting stake 106 into opening 161 oriented to utilize the rectangular portions 161s of that opening. As shown in FIG. 17d, classic stake 171 may be utilized with anchor plate 105 by inserting stake 106 into opening 161 oriented to utilize the rounded portions 161r of that opening. In a preferred embodiment, a stake provided with the tree guard assembly has a length equal or substantially equal to 18 inches and a thickness equal or substantially equal to ½ an inch. In one embodiment, the stake is commercially available.

Figure 18:
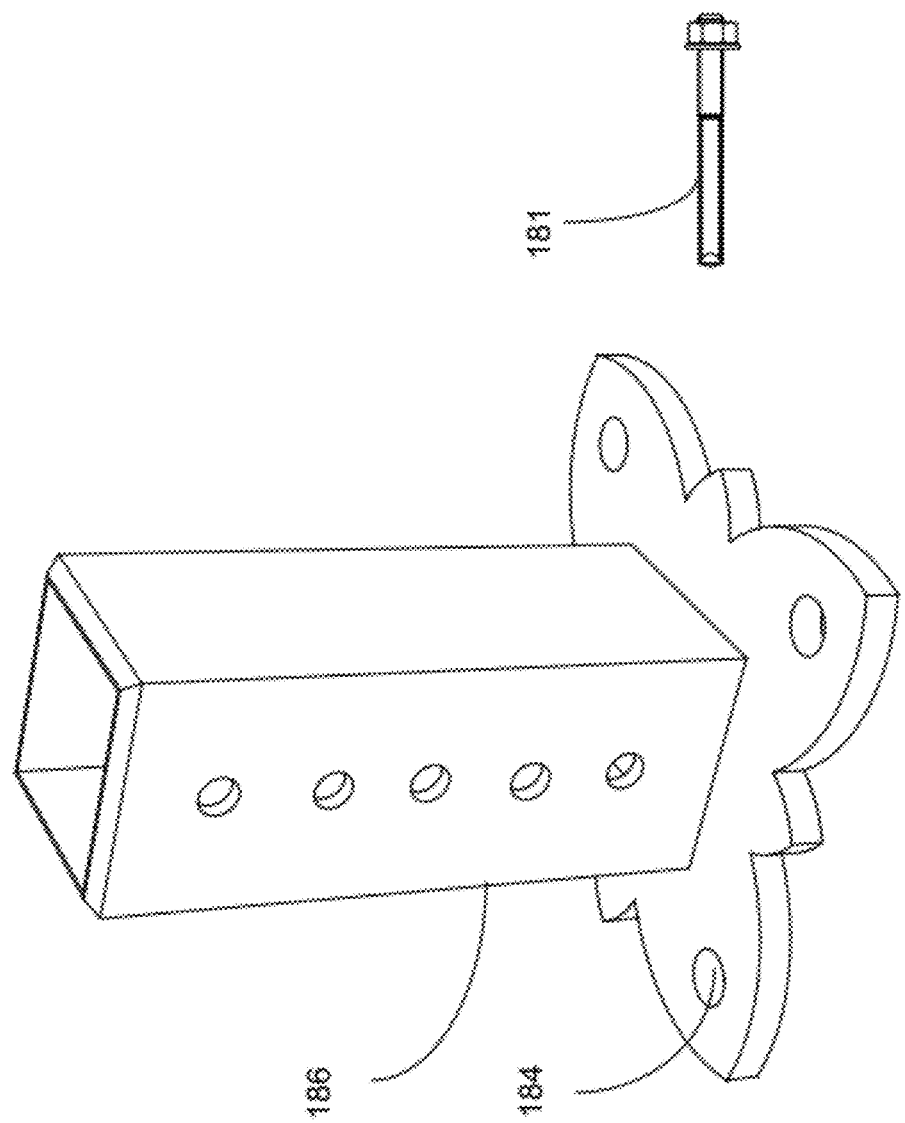
FIG. 18 illustrates an alternative embodiment adjustable foot that may be used when a tree guard consistent with an embodiment of the present invention is to be secured to a concrete surface such as a sidewalk.

FIG. 18 illustrates an alternative foot unit 186 for use when securing the foot to hard ground locations such a concrete or other pavement. This might be necessary when, for example, securing a foot to uncovered ground by use of stakes as illustrated in FIGS. 17a-17d is not practical. Foot unit 18 may be secured, for example, to a concrete sidewalk around a tree pit by use of a concrete screw such as screw 181 inserted through holes 184 of foot unit 186.

Figure 19:
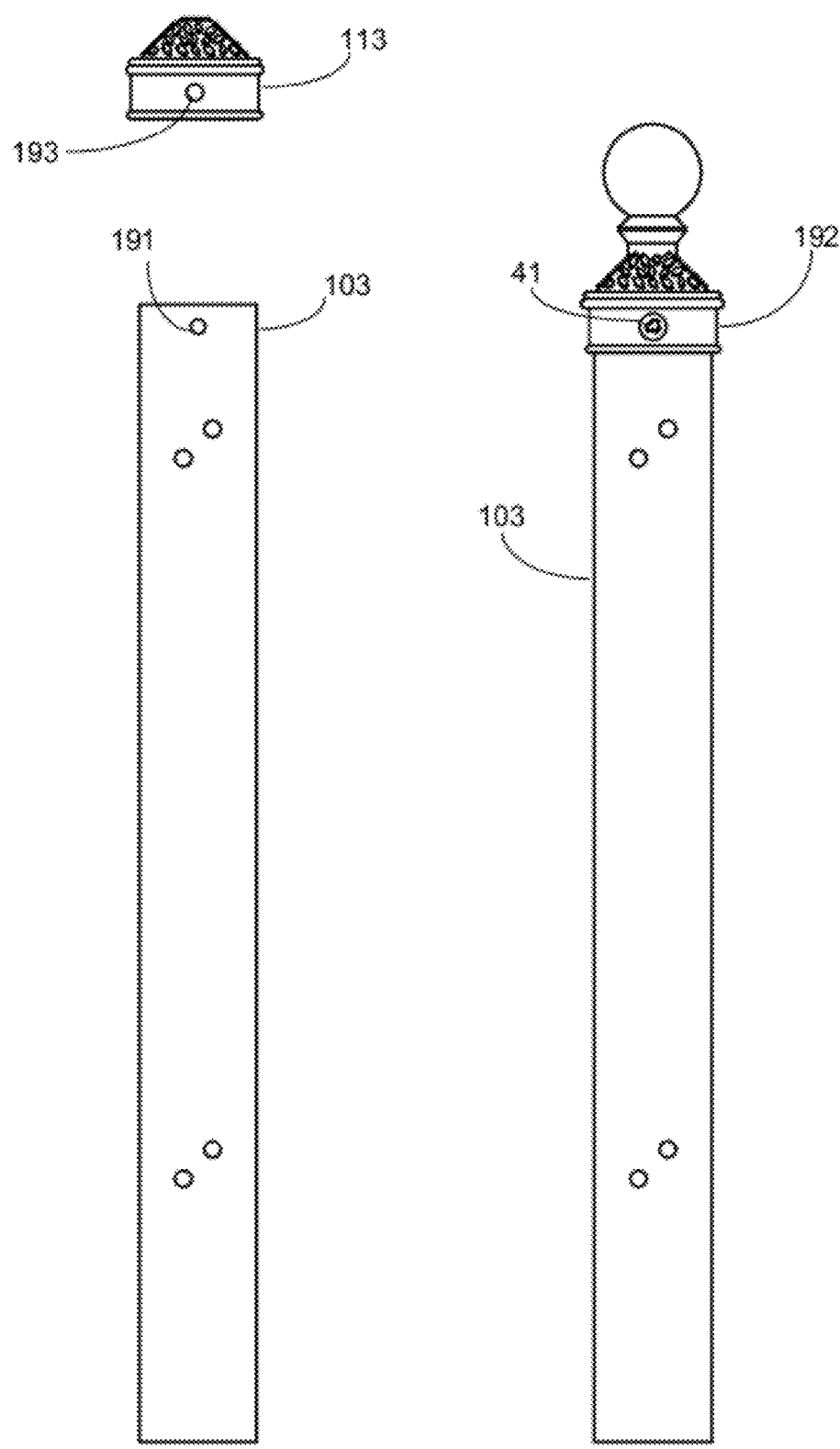
FIG. 19 illustrates a modular post cap of the embodiment of FIG. 1 and details related to removing the modular post cap and replacing it with an alternative post cap.

FIG. 19 illustrates the modularity of post cap 113 of the embodiment of FIG. 1. In particular, post cap 113 (which has a first finial design) can be removed from post unit 103 and replaced by post cap 192 (which has a second finial design). This is facilitated by hole 191 in post 103 and hole 193 in post cap 113. Either post cap 113 or post cap 192 may be secured to post 103 by inserted a bolt 41 through a hole 193 in the post cap and a hole 191 in the post.

Figure 20:
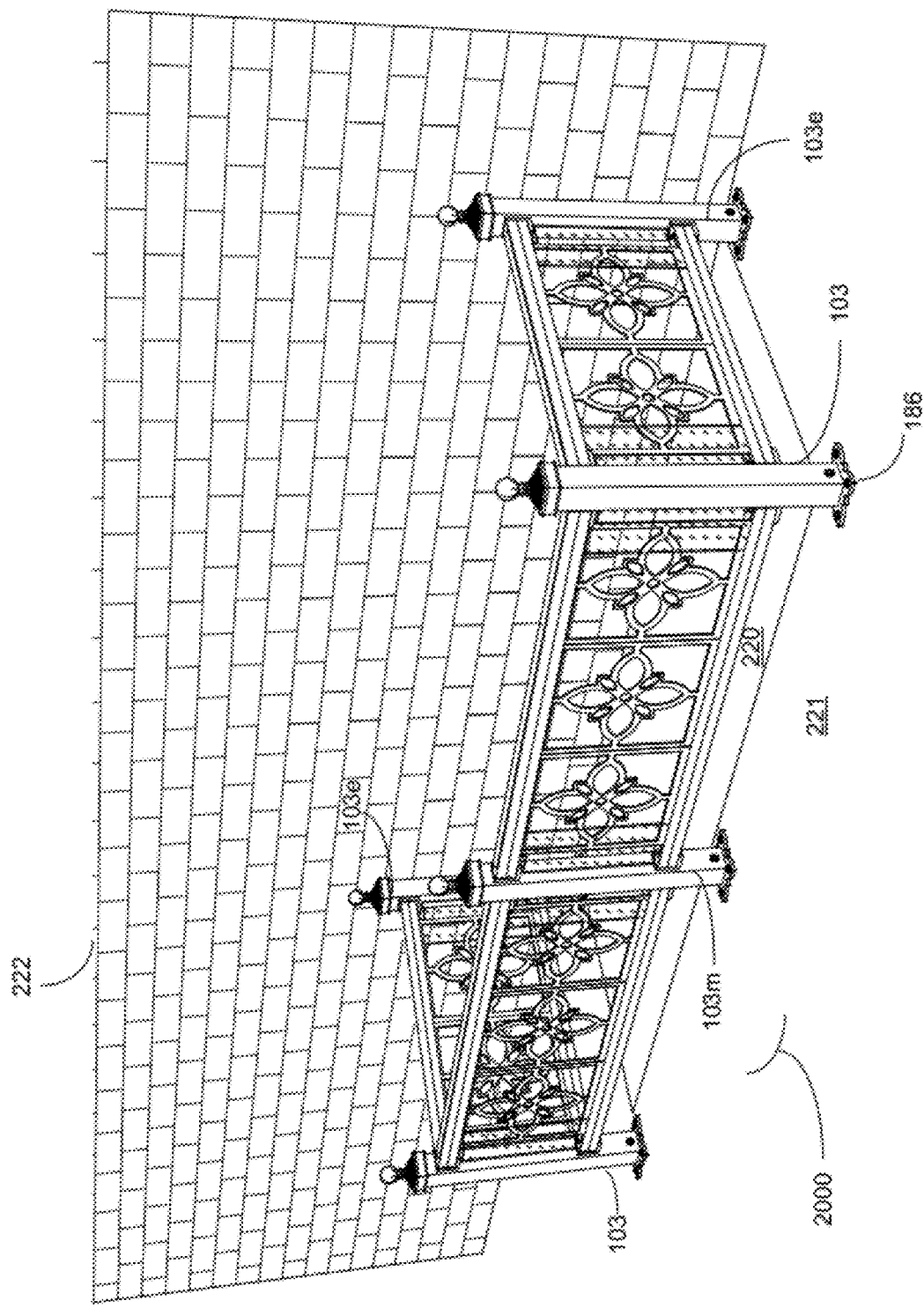
FIG. 20 illustrates a modular tree guard assembly consistent with an alternative embodiment adapted for installation near or against an outer wall of a building.
Figure 21:
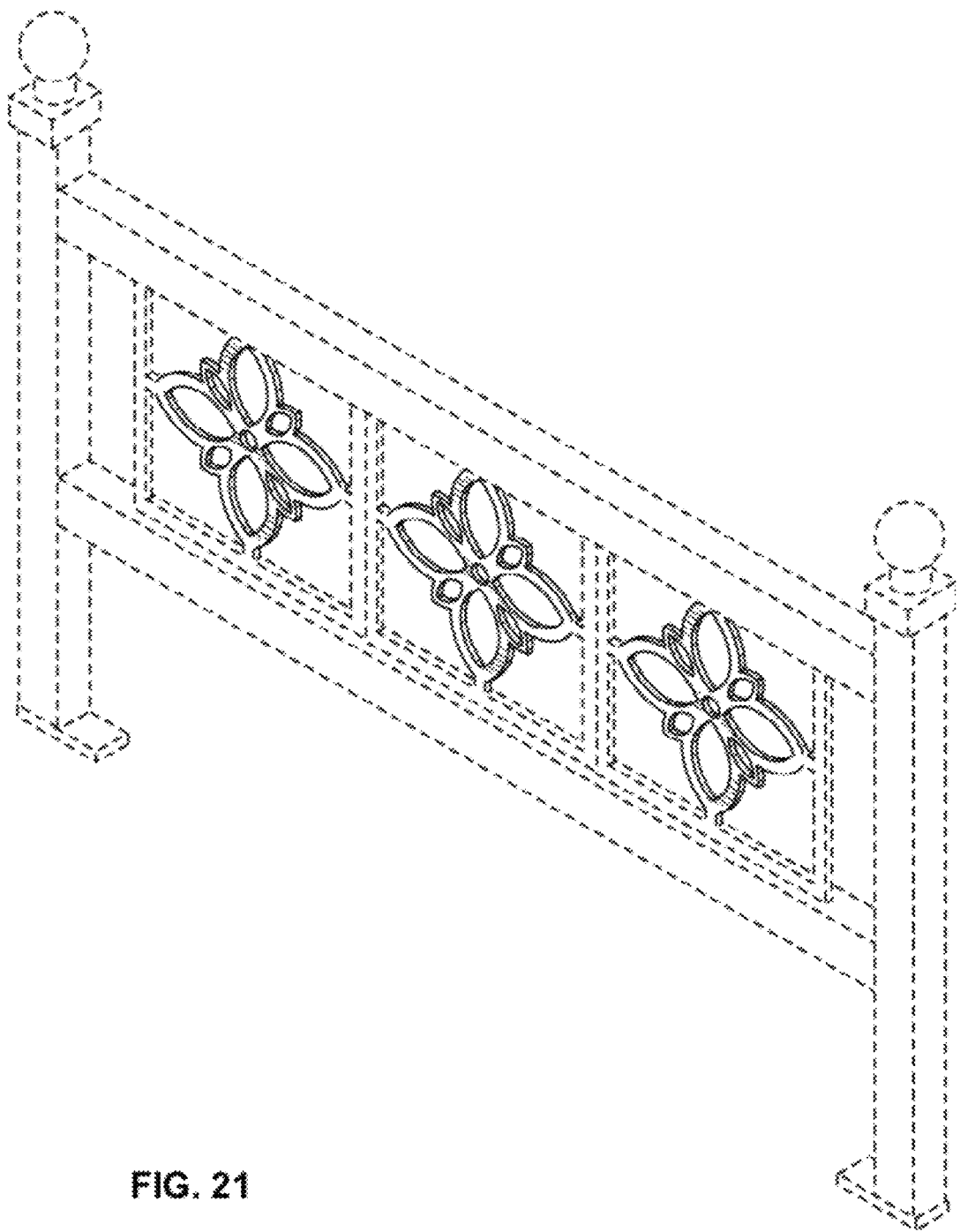
FIG. 21 is a perspective view of a panel in a fence. In this embodiment, three panels are shown adjacent to one another. However, other embodiment may include a single such panel or a different numbers of such panels.
Figure 24:
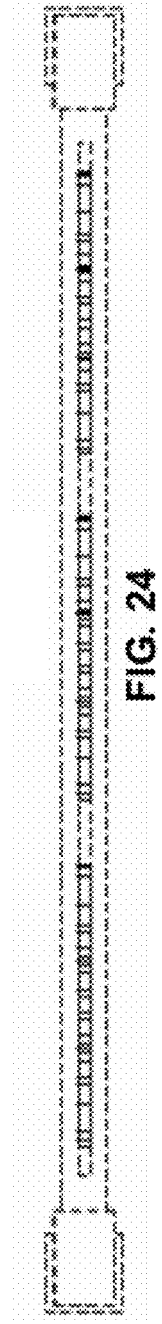
FIG. 24 is a bottom view of the embodiment of FIG. 21.
Figure 25:
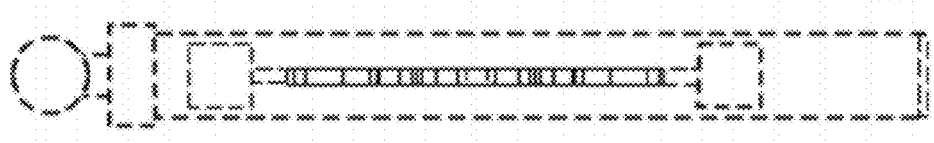
FIG. 25 is a side view of the embodiment of FIG. 21.
Figure 26:
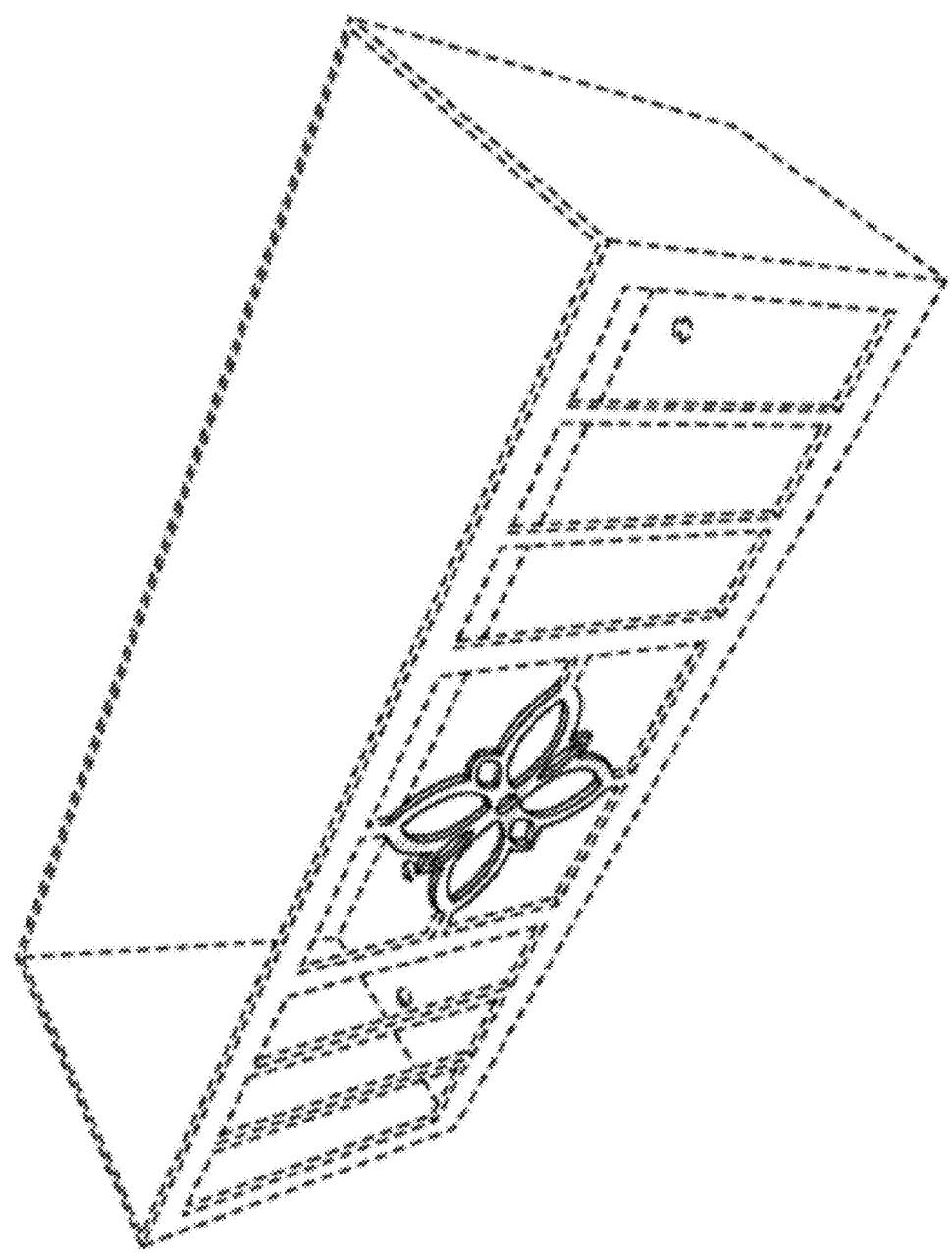
FIG. 26 is a perspective view of a planter box.
Figure 27:
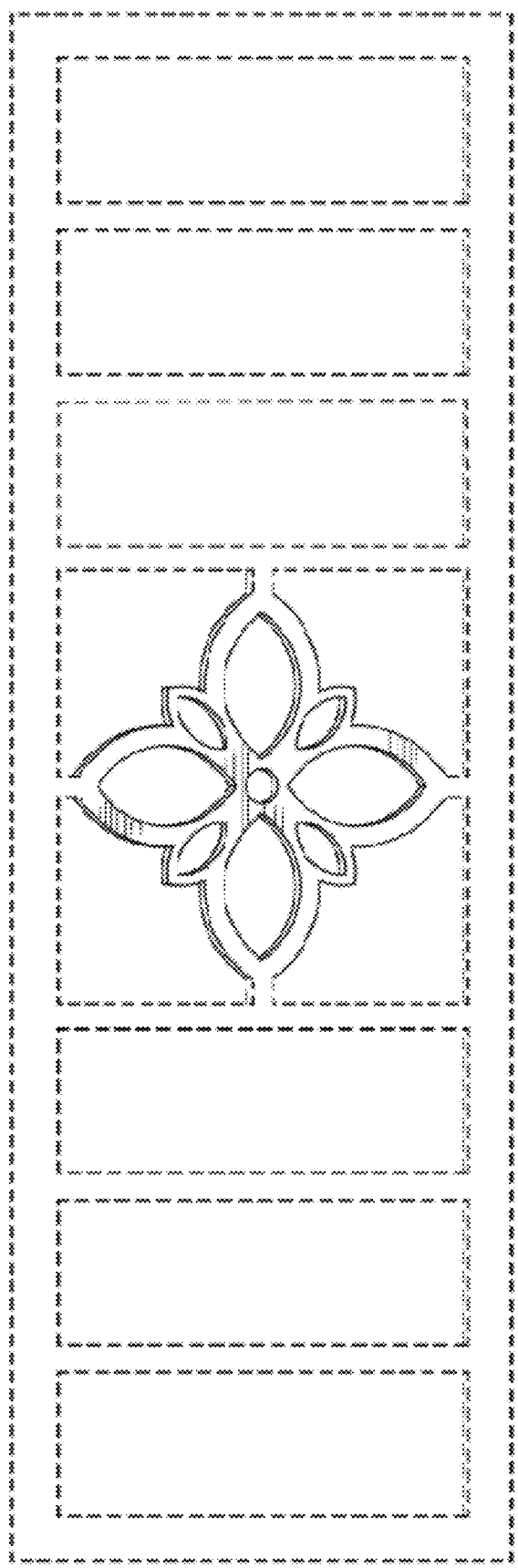
FIG. 27 is a front view of the embodiment of FIG. 26.
Figure 28:
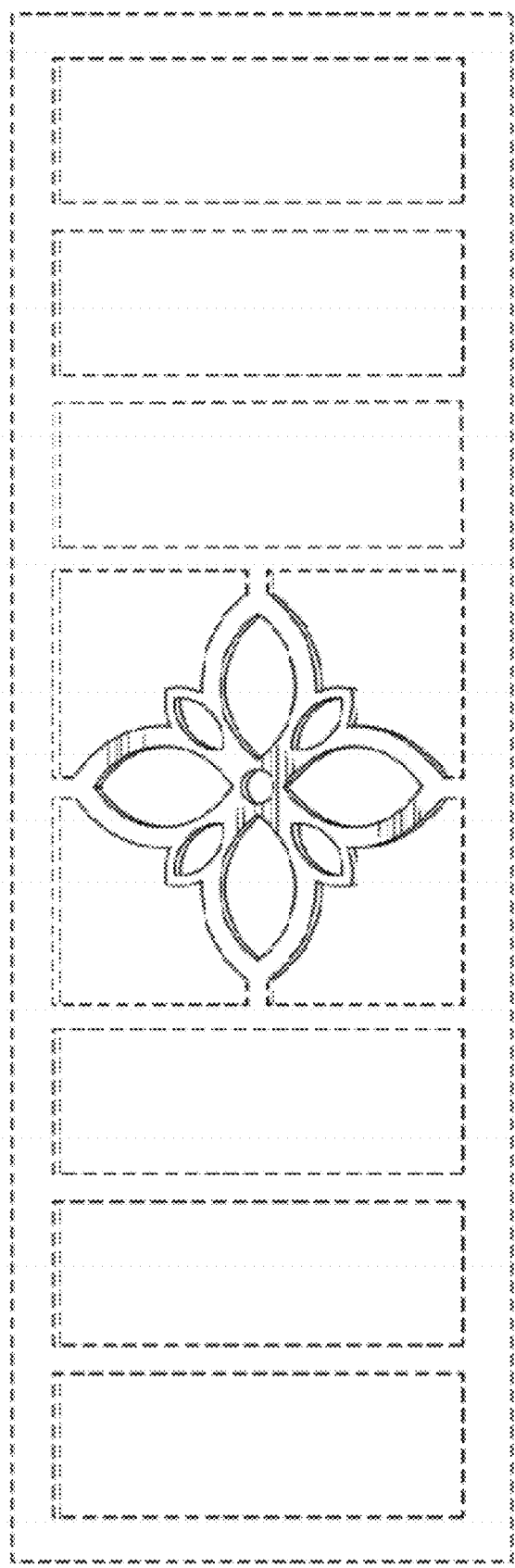
FIG. 28 is rear view of the embodiment of FIG. 26.
Figure 29:
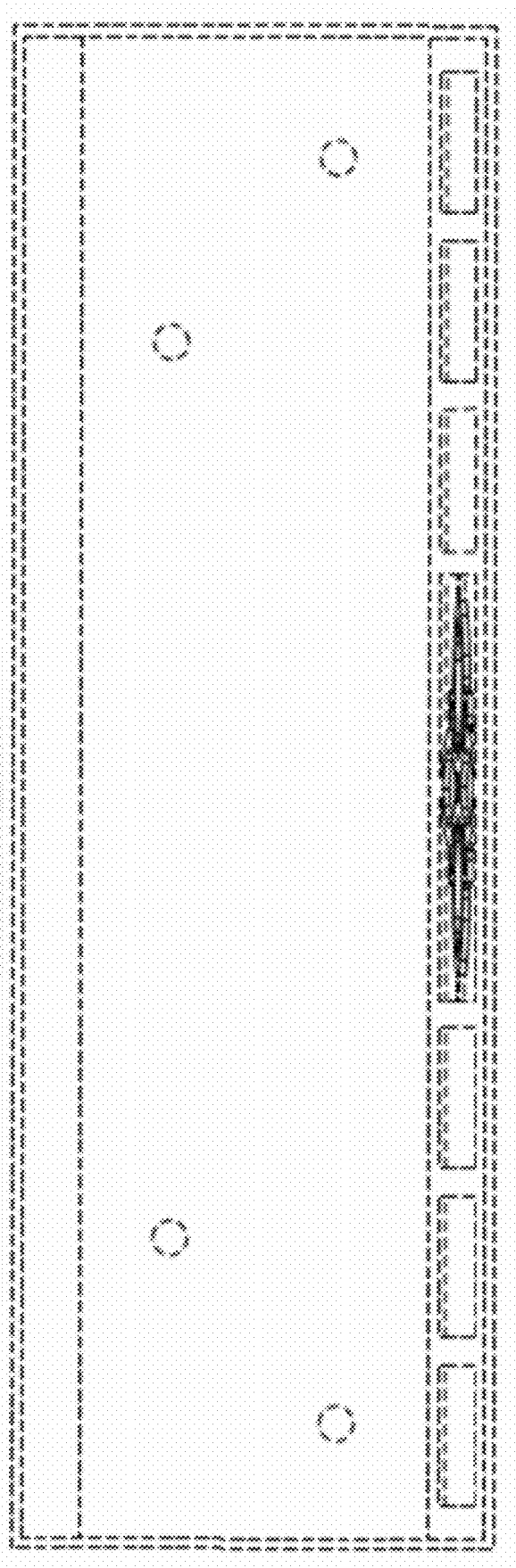
FIG. 29 is a top view of the embodiment of FIG. 26.
Figure 30:
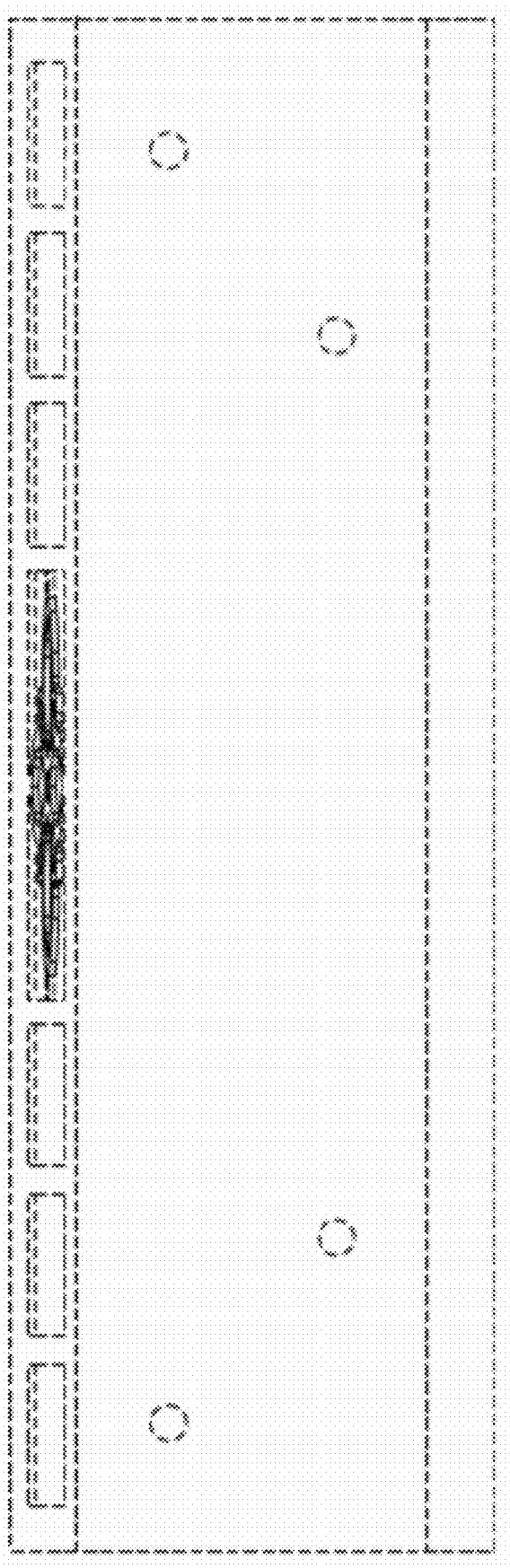
FIG. 30 is a bottom view of the embodiment of FIG. 26.
Figure 31:
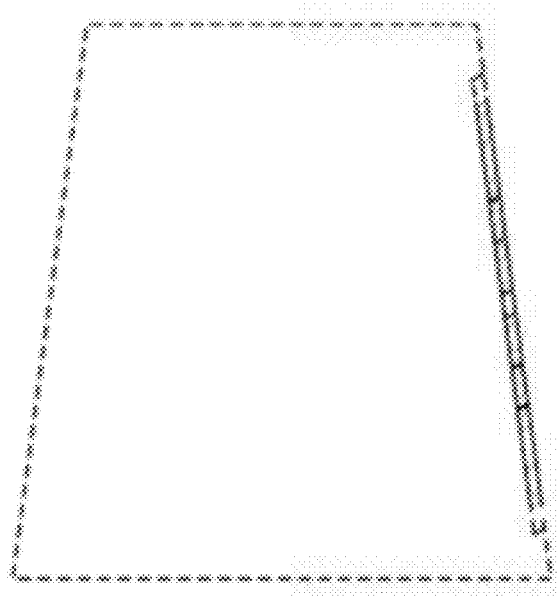
FIG. 31 is a side view of the embodiment of FIG. 26.
Figure 32:
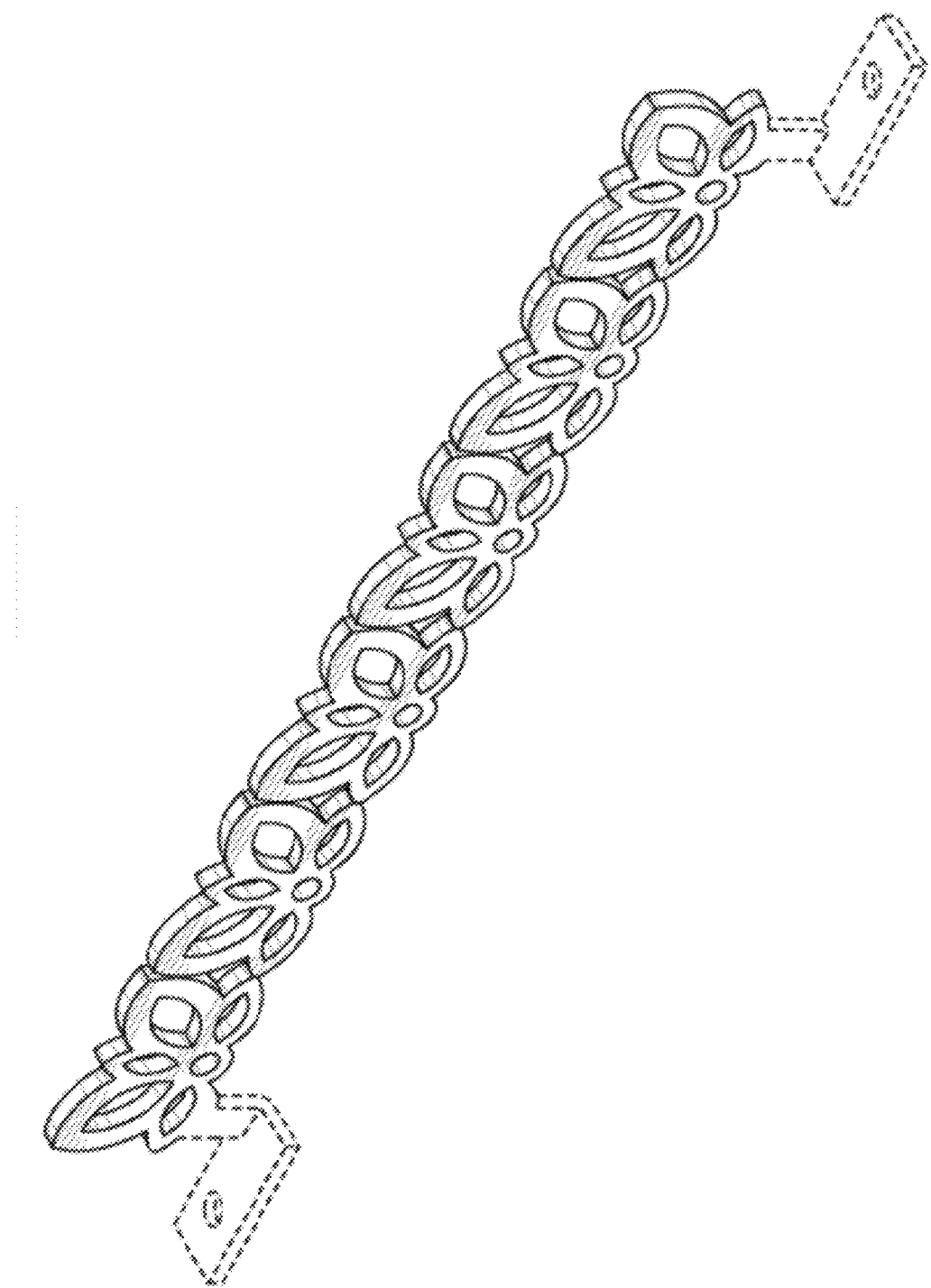
FIG. 32 is a perspective view of a sit spike unit.
Figure 33:
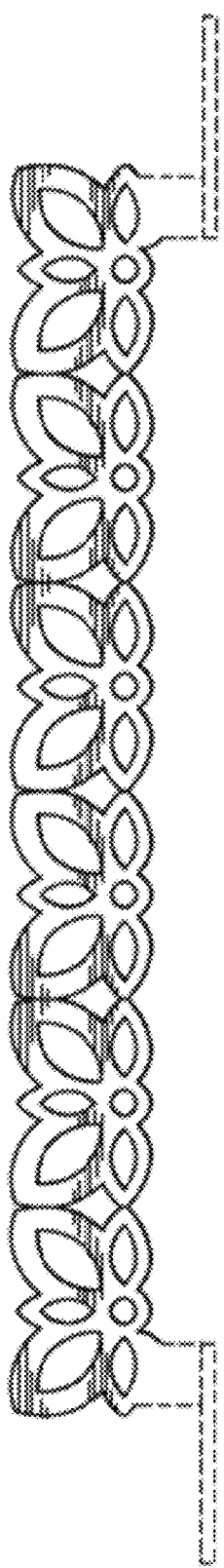
FIG. 33 is a front view of the embodiment of FIG. 32.
Figure 34:
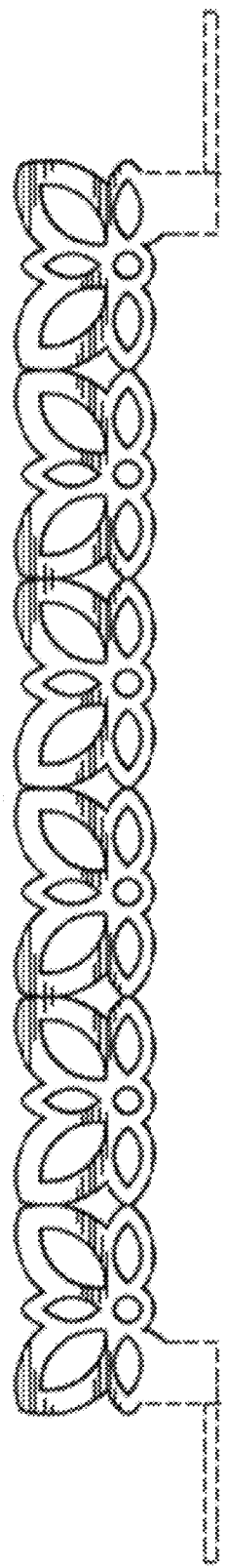
FIG. 34 is rear view of the embodiment of FIG. 32.
Figure 35:
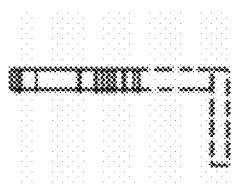
FIG. 35 is a side view of the embodiment of FIG. 32.
Figure 36:
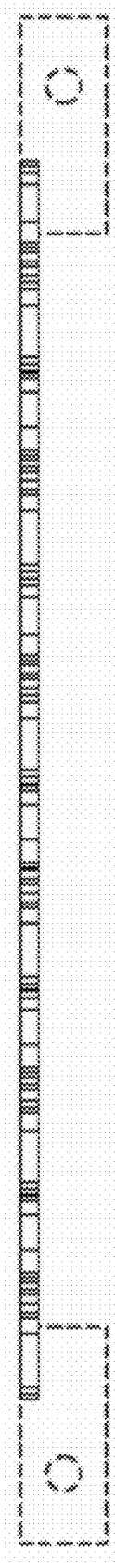
FIG. 36 is a top view of the embodiment of FIG. 32.
Figure 37:
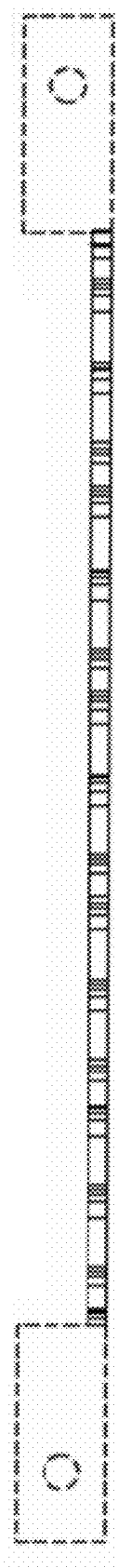
FIG. 37 is a bottom view of the embodiment of FIG. 32.
Figure 38:
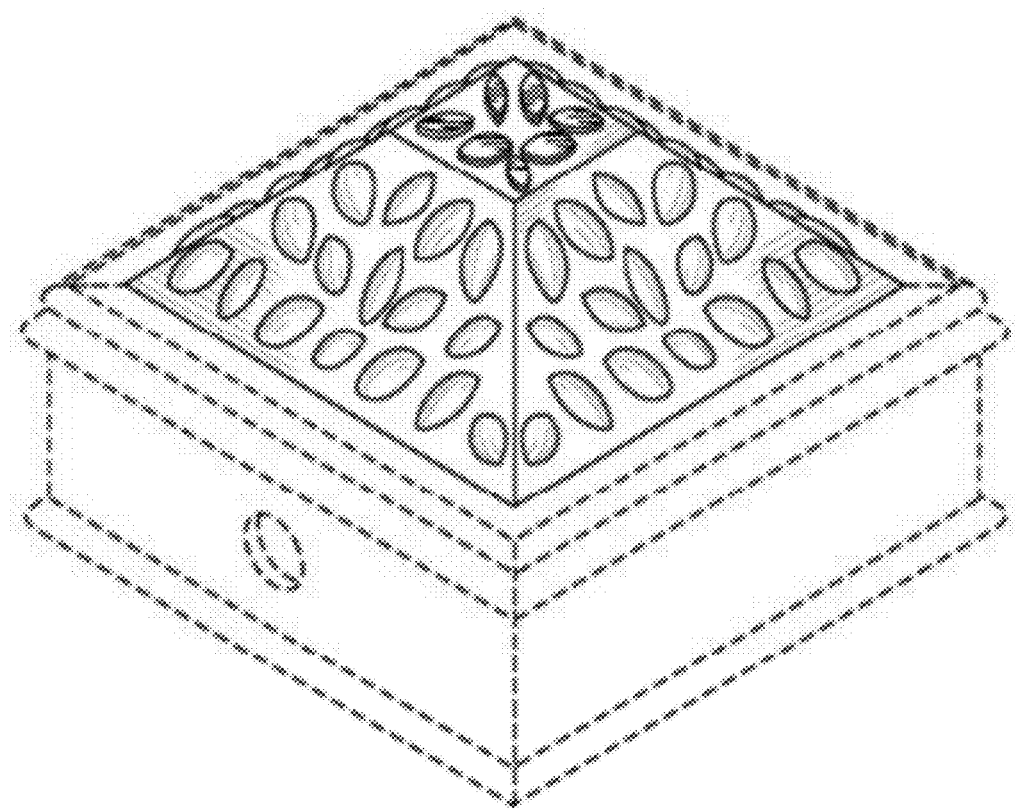
FIG. 38 is a perspective view of a post cap.
Figure 39:
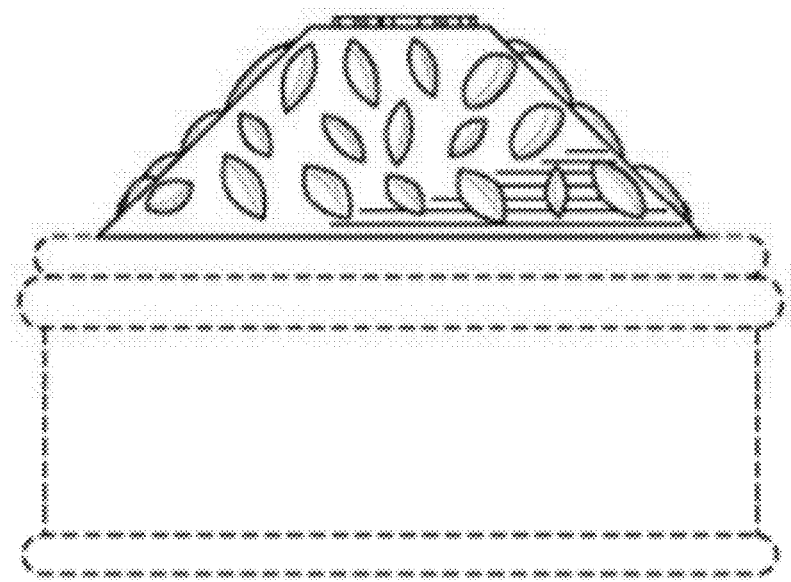
FIG. 39 is a north view of the embodiment of FIG. 38.
Figure 40:
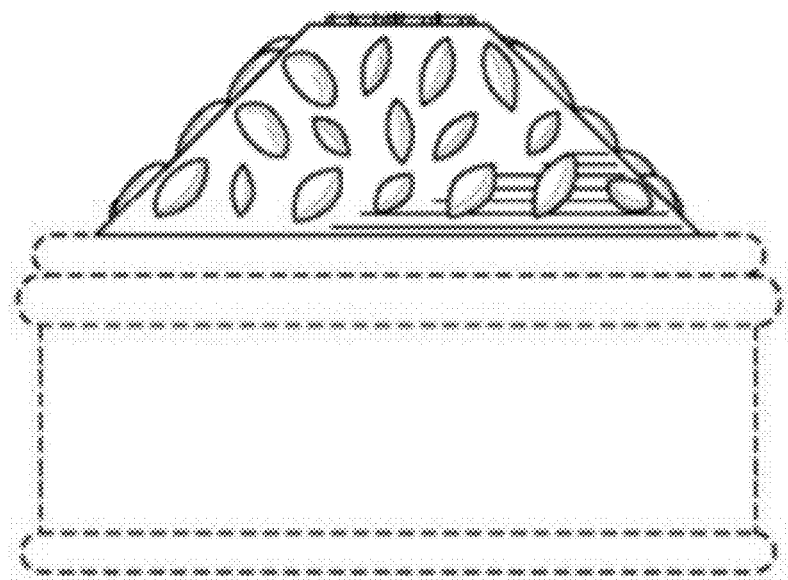
FIG. 40 is an east view of the embodiment of FIG. 38.
Figure 41:
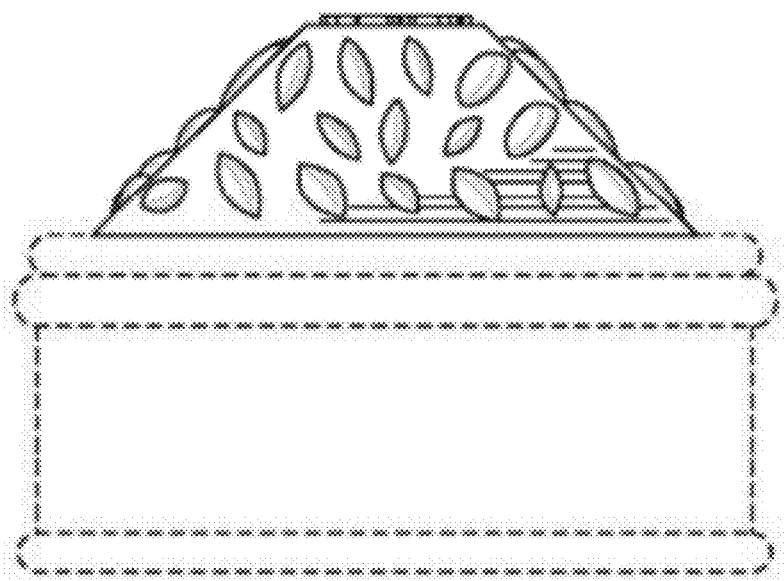
FIG. 41 is a south view of the embodiment of FIG. 38.
Figure 42:
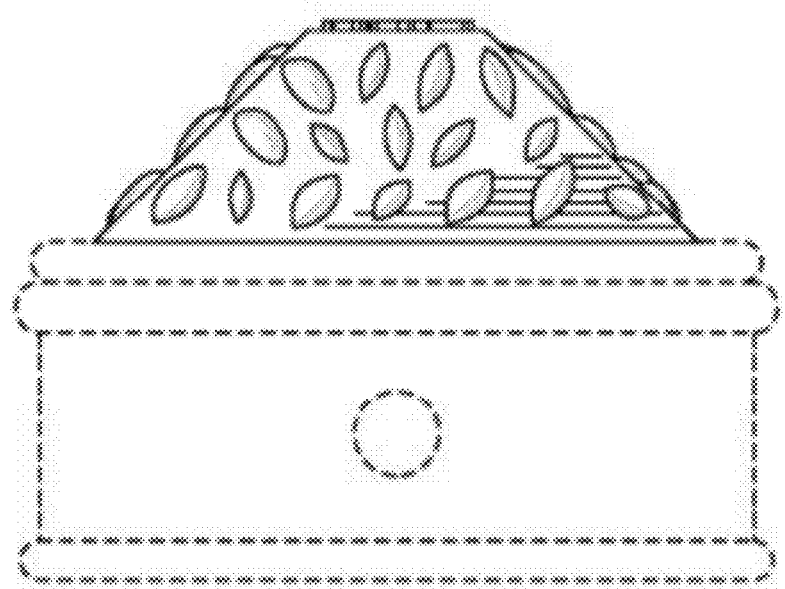
FIG. 42 is a west view of the embodiment of FIG. 38.
Figure 43:
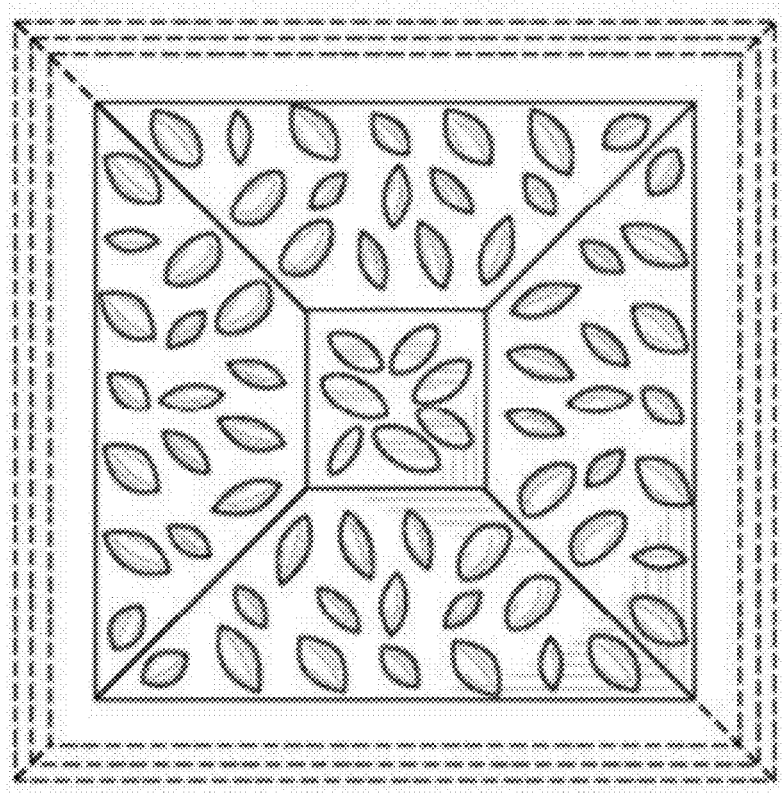
FIG. 43 is a top view of the embodiment of FIG. 38.
Figure 44:
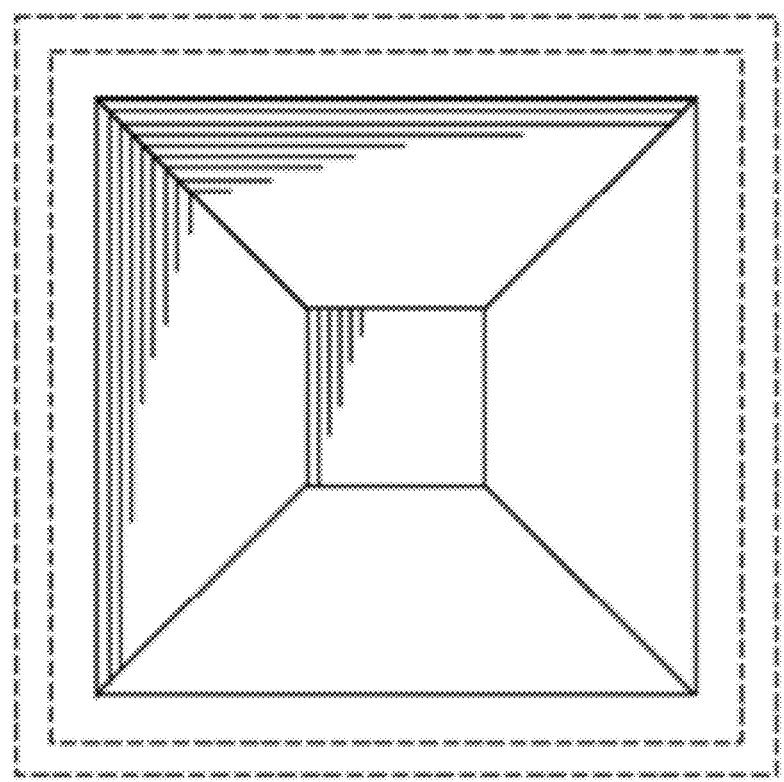
FIG. 44 is a bottom view of the embodiment of FIG. 38.
Figure 45:
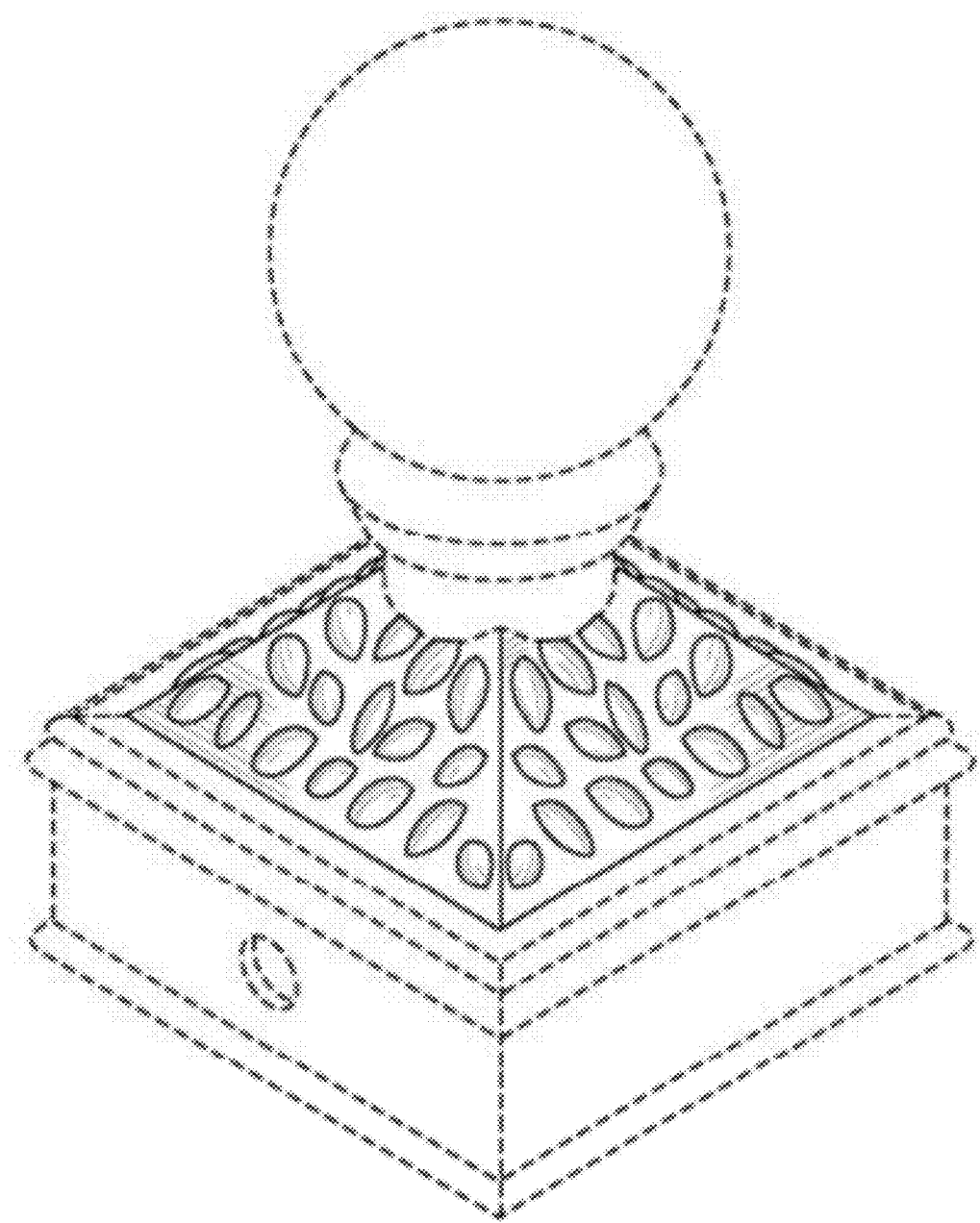
FIG. 45 is a perspective view of an alternative post cap.
Figure 46:
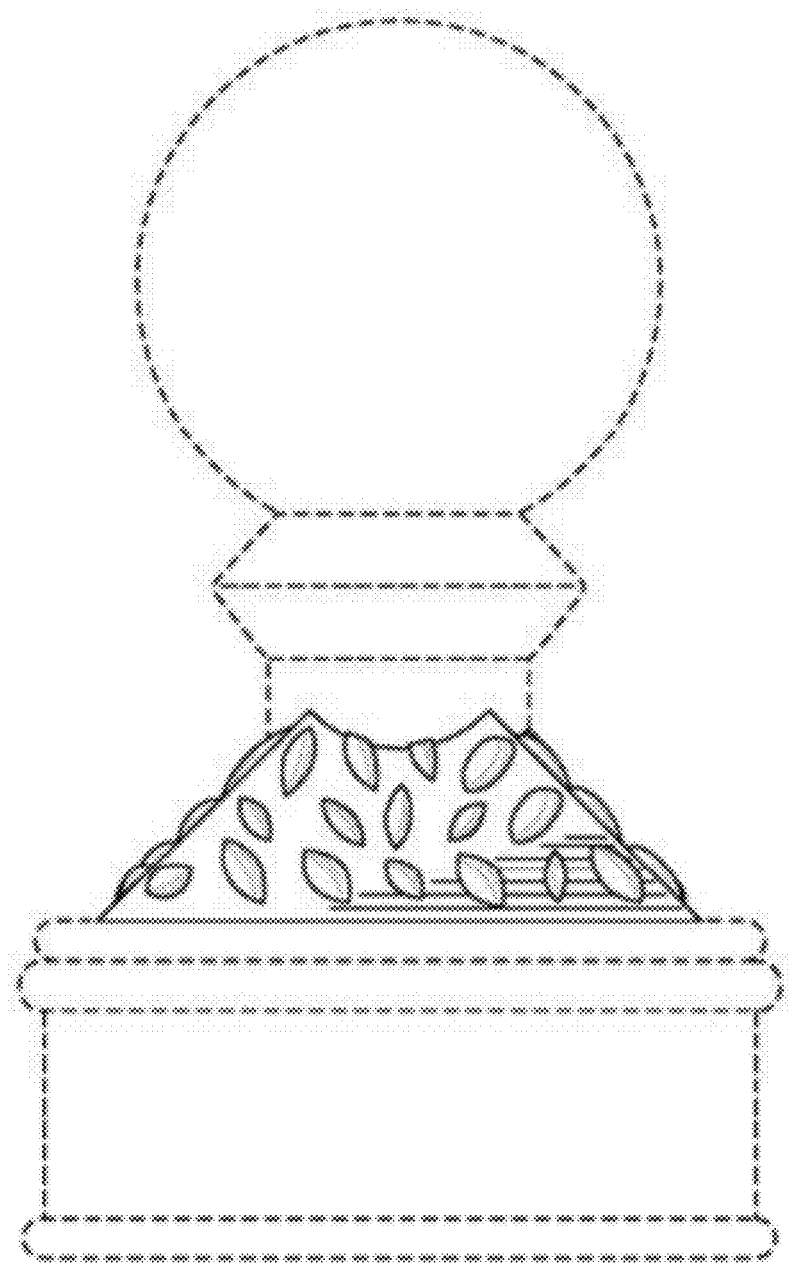
FIG. 46 is a north view of the embodiment of FIG. 45.
Figure 47:
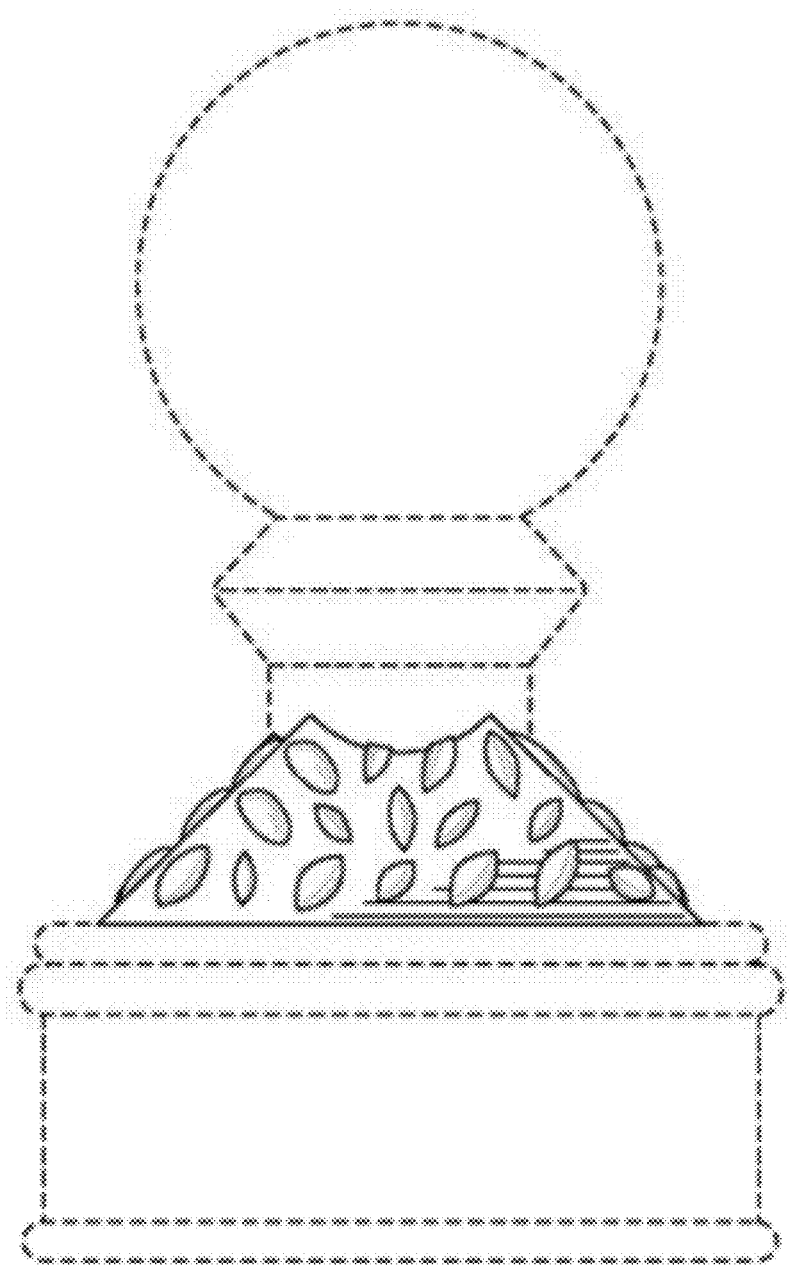
FIG. 47 is an east view of the embodiment of FIG. 45.
Figure 48:
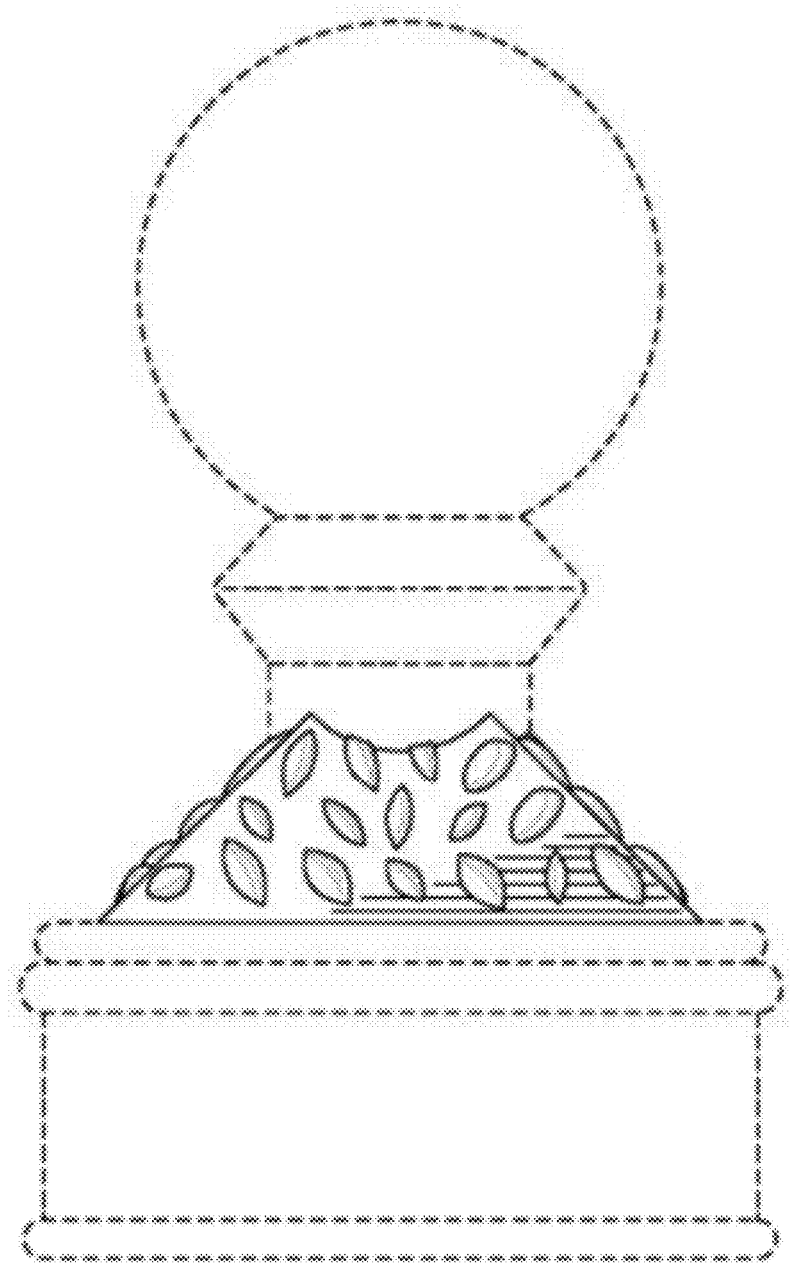
FIG. 48 is a south view of the embodiment of FIG. 45.
Figure 49:
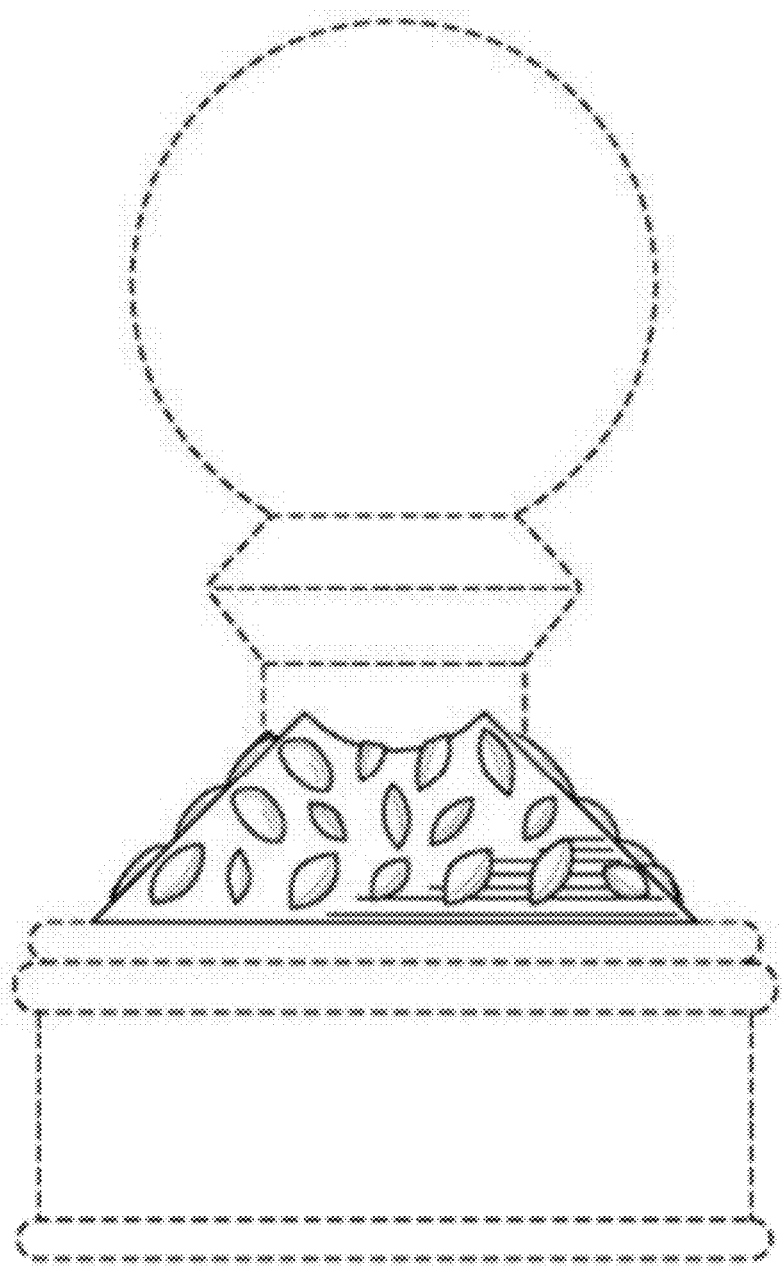
FIG. 49 is a west view of the embodiment of FIG. 45.
Figure 50:
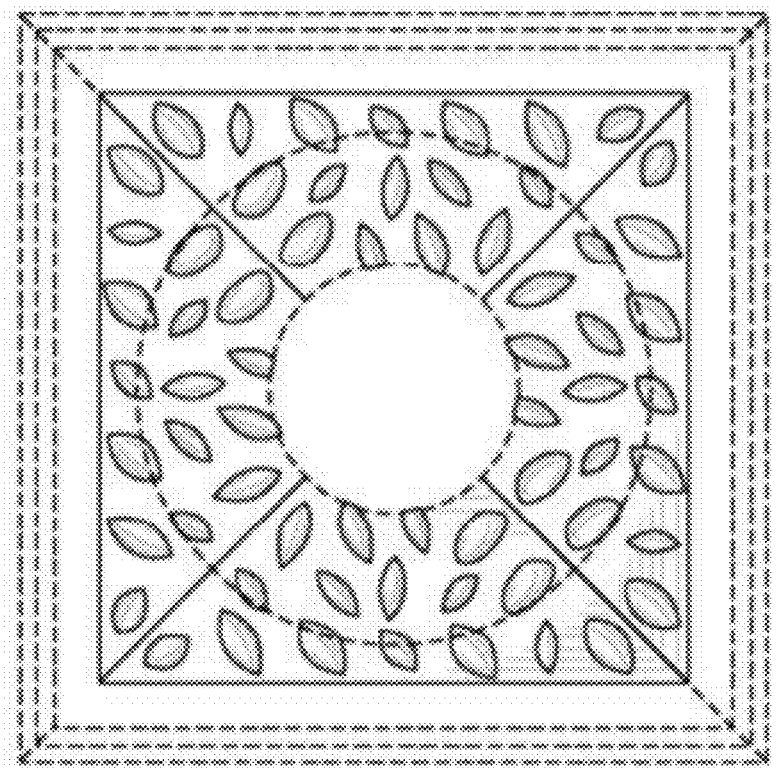
FIG. 50 is a top view of the embodiment of FIG. 45.
Figure 51:
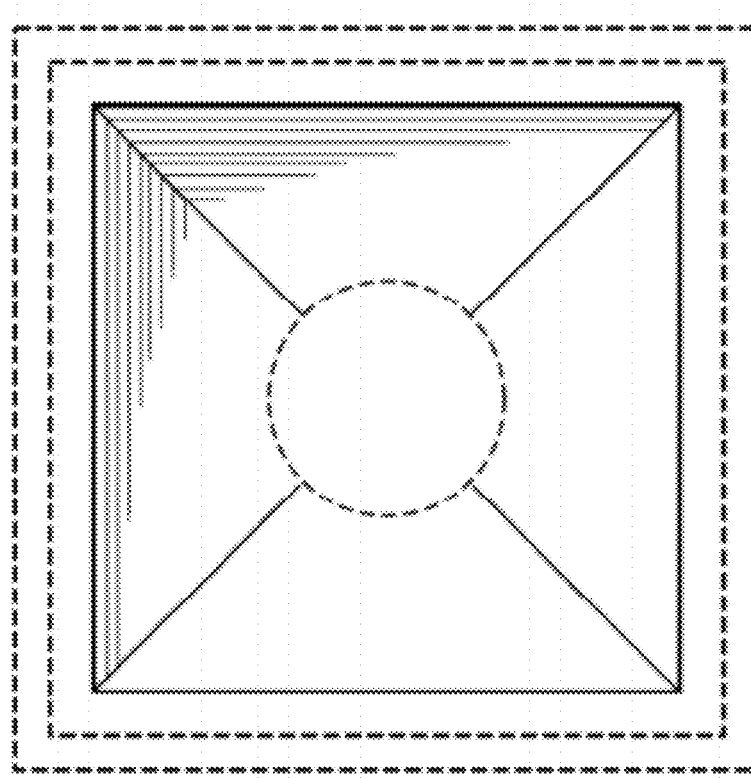
FIG. 51 is a bottom view of the embodiment of FIG. 45.
Figure 53:
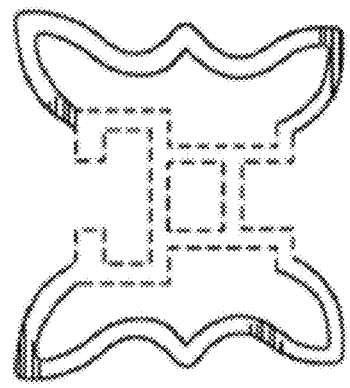
FIG. 53 is a front view of the embodiment of FIG. 52.
Figure 52:
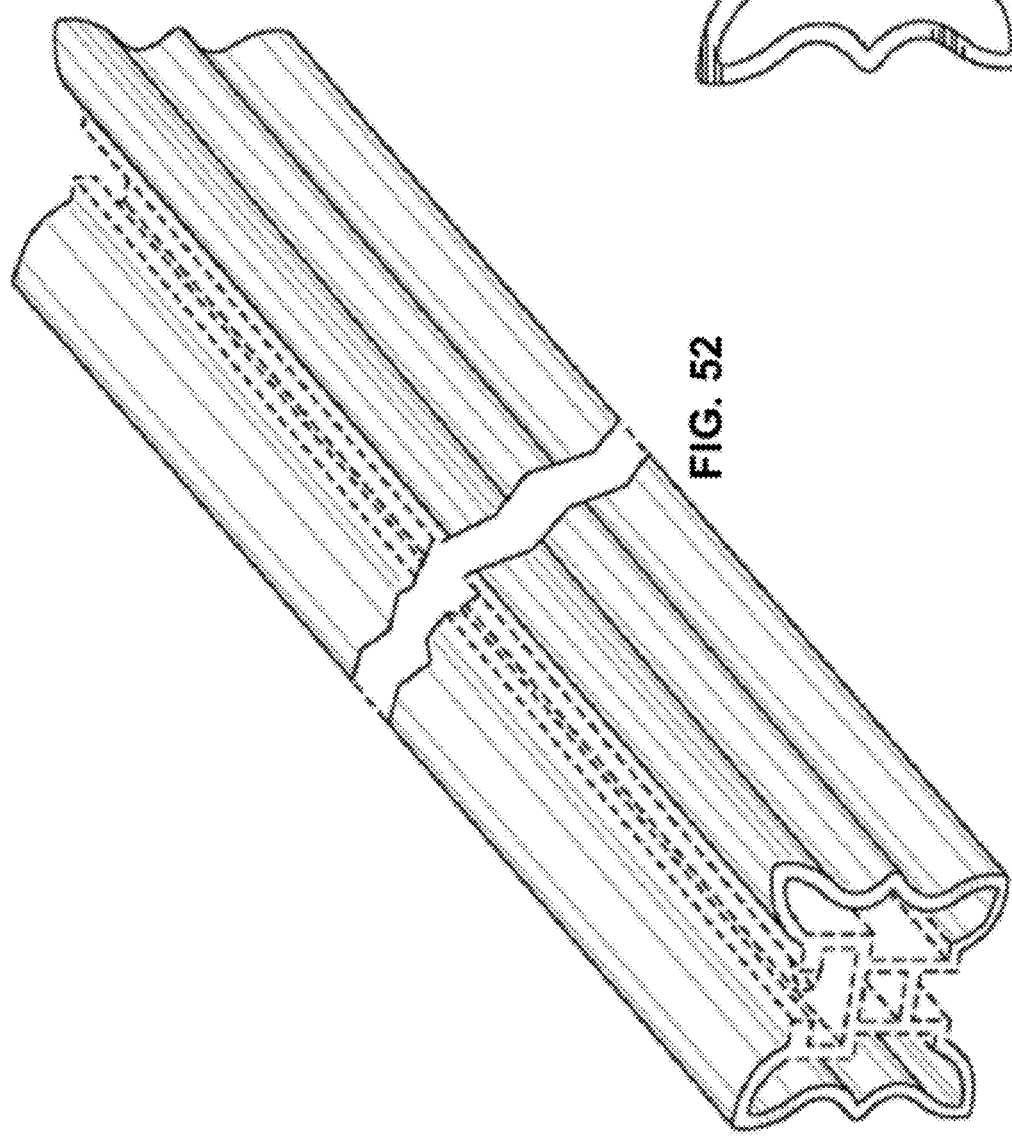
FIG. 52 is a perspective view of a tree guard rail.
Figure 54:
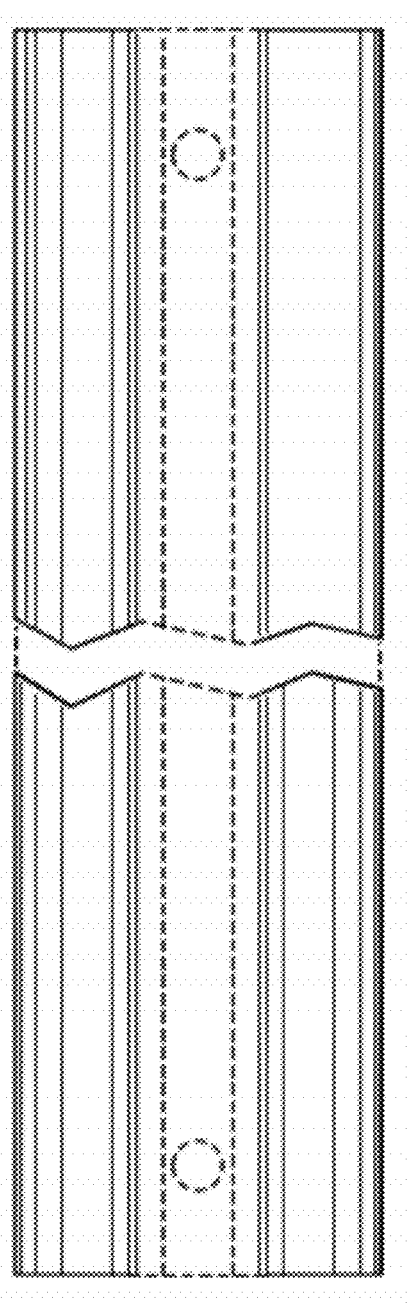
FIG. 54 is a top view of the embodiment of FIG. 52.
Figure 55:
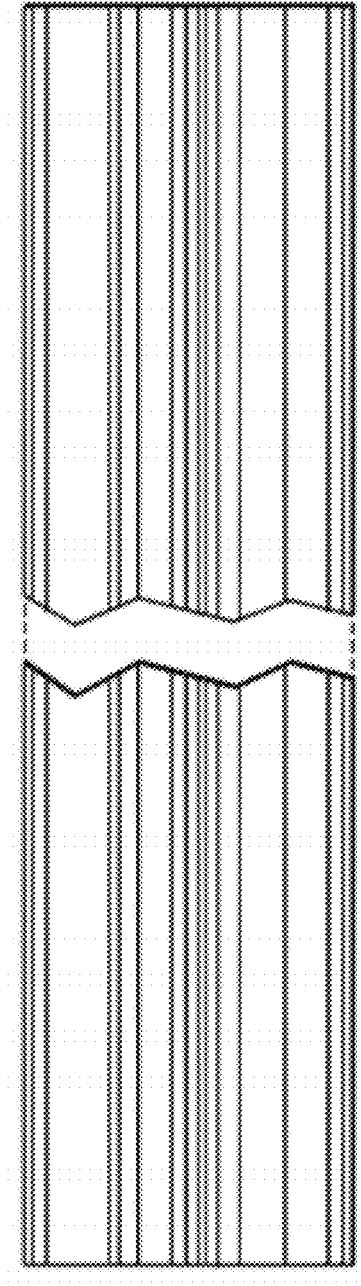
FIG. 55 is a side view of the embodiment of FIG. 52.

FIG. 20 illustrates an alternative embodiment in which a tree guard assembly consistent with an embodiment of the present invention is to be installed against or nearly again a wall (e.g., a wall of a building). Tree guard assembly 2000 includes corner posts 103 and middle post 103m as well as end posts 103e. This arrangement allows installation of tree guard assembly against wall 222. In this example, feet 186 are used to secure posts 103, 103m, and 103e to ground locations on hard ground 221 (e.g. a concrete side walk) and the tree guard is installed just outside of soft ground 220. Moreover, an end post 103e is adapted to couple to rails on just one side of the end post 103e because wall 222 serves the function of a back side of the tree guard and thus rails need not be installed on multiple sides of each end post 103e.

While the invention has been particularly described with respect to the illustrated embodiments, it will be appreciated that various alterations, modifications and adaptations may be made based on the present disclosure, and are intended to be within the scope of the invention. While the invention has been described in connection with what are presently considered to be the most practical and preferred embodiments, it is to be understood that the invention is not limited to the disclosed embodiments but only by the following claims.

What is claimed is:

1. A top rail adapted for use in a modular tree guard system, the top rail comprising:
   a bottom-side groove extending lengthwise along a bottom portion of the top rail, the bottom-side groove having a width dimensioned to contain a top portion of a first side panel of the modular tree guard system;
   a top-side groove extending lengthwise along substantially all of a top portion of the top rail; and
   lips overhanging at least a portion of the top-side groove and extending lengthwise along the top rail, a first gap region being defined between the lips for accessing, from above the top rail through the first gap region, a fastener member positioned within the top-side groove and restrained by a bottom surface of the lips, the first gap region having a first width, the first width being less than a dimension of the fastener member;
   wherein:
   the lips are absent or reduced along at least a portion of the top rail to define a second gap region having a second width greater than the first width to facilitate introducing the fastener member into the top-side groove through the second gap region; and
   the top-side groove and the lips are formed such that the fastener can be introduced into the top-side groove from above the top rail through the second gap region and moved along the top-side groove beneath the bottom surface of the lips defining the first gap region for use in securing a top-rail accessory placed at a desired location on a top surface of the lips.

2. The top rail of claim 1 wherein the fastener member is a female fastener.

3. The top rail of claim 2 wherein the female fastener is an extended nut.

4. The top rail of claim 3 wherein the extended nut is a weld nut.

5. The top rail of claim 1 wherein the width of the bottom-side groove is dimensioned to contain a top portion of a second side panel of the modular tree guard system, the second side panel being positioned to overlap with the first side panel, the second side panel being a urine guard.

6. A modular tree guard system comprising:
   a plurality of posts;
   one or more top rails; and
   one or more bottom rails;
   wherein:
   the one or more top rails, the one or more bottom rails, and the plurality of posts are adapted to be coupled together such that a top rail of the one or more top rails and a bottom rail of the one or more bottom rails are coupled between two posts of the plurality of posts;
   a top rail of the one or more top rails and a bottom rail of the one or more bottom rails are adapted to hold a side panel between the top rail of the one or more top rails and the bottom rail of the one or more bottom rails; and
   a top rail of the one or more top rails comprises:
      a top-side groove extending lengthwise along substantially all of a top portion of the top rail; and
      lips overhanging at least a portion of the top-side groove and extending lengthwise along the top rail, a first gap region being defined between the lips for accessing, from above the top rail through the first gap region, a fastener member positioned within the top-side groove and restrained by a bottom surface of the lips, the first gap region having a first width, the first width being less than a dimension of the fastener member;
   and further wherein:
   the lips are absent or reduced along at least a portion of the top rail to define a second gap region having a second width greater than the first width to facilitate introducing the fastener member into the top-side groove through the second gap region; and
   the top-side groove and the lips are formed such that the fastener can be introduced into the top-side groove from above the top rail through the second gap region and moved along the top-side groove beneath the bottom surface of the lips defining the first gap region for use in securing a top-rail accessory placed at a desired location on a top surface of the lips.

7. The modular tree guard system of claim 6 wherein the top rail and the bottom rail are adapted to hold two overlapping side panels between the top rail and the bottom rail.

8. The modular tree guard system of claim 6 further comprising a plurality of side panels wherein the plurality of side panels includes a decorative side panel and a urine guard side panel.

9. The modular tree guard system of claim 7 further comprising a plurality of side panels wherein the plurality of side panels includes a decorative side panel and a urine guard side panel.

10. The modular tree guard system of claim 6 further comprising a plurality of side panels wherein the plurality of side panels includes a plurality of urine guard side panels and at least one of the plurality of urine guard side panels is a corner urine guard side panel.

11. The modular tree guard system of claim 6 further comprising a plurality of side panels wherein the plurality of side panels includes a plurality of decorative side panels including at least a first side panel with a first decorative design and a second side panel with a second decorative design.

12. The modular tree guard system of claim 6 further comprising a plurality of post caps wherein the plurality of posts and the plurality of post caps are adapted to be detachably connected.

13. The modular tree guard system of claim 12 wherein the plurality of post caps includes first and second types such that a first post cap type may be removed and replaced with a second post cap type.

14. The modular tree guard system of claim 6 wherein the plurality of posts includes a plurality of corner posts, a corner post of the plurality of corner posts being adapted to couple a first and a second rail at an angle of substantially 90 degrees, the plurality of posts further including: at least one middle post adapted to couple another first rail and another second rail at an angle of substantially 180 degrees.

15. The modular tree guard system of claim 6 wherein the plurality of posts includes at least one end post adapted to couple a top rail of the one or more top rails and a bottom rail of the one or more bottom rails on only one side of the at least one end post to facilitate use of the modular tree guard system against a pre-existing wall.

16. The modular tree guard system of claim 6 wherein a top rail of the one or more top rails includes a slot to receive a side panel to be installed between the top rail of the one or more top rails and a bottom rail of the one or more bottom rails.

17. The modular tree guard system of claim 6 further comprising a plurality of top rail accessories adapted to be installed above the top rail of the one or more top rails.

18. A top-most rail adapted for use in a modular tree guard system, the top-most rail comprising:
a bottom-side groove extending lengthwise along a bottom portion of the top-most rail, the bottom-side groove having a width dimensioned to contain a top portion of a first side panel of the modular tree guard system;
a top-side groove extending lengthwise along a top portion of the top-most rail; and
a slot formed through the top-most rail from at least a portion of the top-side groove to at least a portion of the bottom-side groove, the slot being dimensioned to allow the first side panel to be passed through the top-most rail until a bottom portion of the first side panel rests contained in a top-side groove of a bottom rail and the top portion of the first side panel rests contained in the bottom-side groove of the top-most rail.

19. The top-most rail of claim 18 wherein the width of the bottom-side groove is dimensioned to contain a top portion of a second side panel of the modular tree guard system, the second side panel being positioned to overlap with the first side panel, the second side panel being a urine guard.

20. The top-most rail of claim 18 wherein the top-side groove is defined in part by lips extending lengthwise and overhanging a portion of the top-side groove, the top-side groove and lips being adapted to contain a movable fastener member such that the top-most rail is adapted to allow fastening of a top-rail accessory at a selectable position above the top-side groove.

21. The top-most rail of claim 20 wherein the lips are reduced or absent along a portion of the top-side groove to form a widened region to facilitate introducing the moveable fastener member into the top-side groove.

22. A modular tree guard system comprising:
a plurality of posts;
one or more top-most rails; and
one or more bottom rails;
wherein:
the one or more top-most rails, the one or more bottom rails, and the plurality of posts are adapted to be coupled together such that a top-most rail of the one or more top-most rails and a bottom rail of the one or more bottom rails are coupled between two posts of the plurality of posts;
a top-most rail of the one or more top-most rails and a bottom rail of the one or more bottom rails are adapted to hold a side panel between the top-most rail of the one or more top-most rails and the bottom rail of the one or more bottom rails; and
a top-most rail of the one or more top-most rails comprises:
a bottom-side groove extending lengthwise along a bottom portion of the top-most rail, the bottom-side groove having a width dimensioned to contain a top portion of a first side panel usable in the modular tree guard system;
a top-side groove extending lengthwise along a top portion of the top-most rail; and
a slot formed through the top-most rail from at least a portion of the top-side groove to at least a portion of the bottom-side groove, the slot being dimensioned to allow the first side panel to be passed through the top-most rail until a bottom portion of the first side panel rests contained in a top-side groove of a bottom rail and the top portion of the first side panel rests contained in the bottom-side groove of the top-most rail.

23. The modular tree guard system of claim 22 wherein the top-most rail and the bottom rail are adapted to hold two overlapping side panels of a plurality of side panels between the top-most rail and the bottom rail.

24. The modular tree guard system of claim 23 further comprising the plurality of side panels including a decorative side panel and a urine guard side panel.

25. The modular tree guard system of claim 22 further comprising a plurality of side panels wherein the plurality of side panels includes a plurality of urine guard side panels and at least one of the plurality of urine guard side panels is a corner urine guard side panel.

26. The modular tree guard system of claim 22 wherein the plurality of posts includes a plurality of corner posts, a corner post of the plurality of corner posts being adapted to couple a first and a second rail at an angle of substantially 90 degrees, the plurality of posts further including: at least one middle post adapted to couple another first rail and another second rail at an angle of substantially 180 degrees.

27. The modular tree guard system of claim 22 wherein the plurality of posts includes at least one end post adapted to couple a top-most rail of the one or more top-most rails and a bottom rail of the one or more bottom rails on only one side of the at least one end post to facilitate use of the modular tree guard system against a pre-existing wall.

\* \* \* \* \*